(12) United States Patent
Láinez Rodrigo et al.

(10) Patent No.: US 12,079,573 B2
(45) Date of Patent: Sep. 3, 2024

(54) TOOL FOR CATEGORIZING AND EXTRACTING DATA FROM AUDIO CONVERSATIONS

(71) Applicant: Twilio Inc., San Francisco, CA (US)

(72) Inventors: Alfredo Láinez Rodrigo, Madrid (ES); Tyler Cole, Diamond Bar, CA (US); Umair Akeel, San Ramon, CA (US); Luke Percival de Oliveira, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 304 days.

(21) Appl. No.: 17/449,405

(22) Filed: Sep. 29, 2021

(65) Prior Publication Data

US 2022/0156460 A1 May 19, 2022

Related U.S. Application Data

(60) Provisional application No. 63/145,120, filed on Feb. 3, 2021, provisional application No. 63/133,070, filed on Dec. 31, 2020, provisional application No. 63/115,211, filed on Nov. 18, 2020.

(51) Int. Cl.
*G06F 40/279* (2020.01)
*G06F 16/65* (2019.01)
*G06N 20/00* (2019.01)

(52) U.S. Cl.
CPC ............ *G06F 40/279* (2020.01); *G06F 16/65* (2019.01); *G06N 20/00* (2019.01)

(58) Field of Classification Search
CPC ........ G06F 40/279; G06F 16/65; G06N 20/00
See application file for complete search history.

(56) References Cited

U.S. PATENT DOCUMENTS

| | | | |
|---|---|---|---|
| 5,384,703 A | 1/1995 | Withgott et al. |
| 6,567,805 B1 | 5/2003 | Johnson et al. |
| 7,702,508 B2 | 4/2010 | Bennett |
| 7,725,321 B2 | 5/2010 | Bennett |

(Continued)

FOREIGN PATENT DOCUMENTS

WO 2022086939 4/2022

OTHER PUBLICATIONS

"U.S. Appl. No. 17/447,039, filed Apr. 21, 2023 to Final Office Action mailed Feb. 21, 2023", 11 pgs.

(Continued)

*Primary Examiner* — Ibrahim Siddo
(74) *Attorney, Agent, or Firm* — Schwegman Lundberg & Woessner, P.A.

(57) ABSTRACT

Methods, systems, and computer programs are presented for classifying information in conversations and extracting information from the conversations. An Engagement Intelligence Platform (EIP) analyzes transcripts of conversations to find different states and information associated with each of the states (e.g., identification that the interest rate was quoted, and the quoted value of the interest rate). The EIP analyzes the conversation and labels (e.g., "tags") the text where the conversation associated with the label took place, such as, "An interest rate was provided." The labels are customizable, so each client can define its own labels based on business needs. Further, the EIP extracts data from the conversation (e.g., the interest rate is "3%").

20 Claims, 18 Drawing Sheets

(56) References Cited

U.S. PATENT DOCUMENTS

| | | | |
|---|---|---|---|
| 7,801,910 | B2 | 9/2010 | Houh et al. |
| 8,428,227 | B2 | 4/2013 | Angel et al. |
| 8,494,133 | B2 | 7/2013 | Jeffs et al. |
| 8,775,165 | B1 | 7/2014 | Oikawa |
| 8,798,242 | B1 | 8/2014 | Sankaranarayanan |
| 8,942,359 | B2 | 1/2015 | Seetharaman et al. |
| 9,880,807 | B1 | 1/2018 | Haggerty et al. |
| 9,910,909 | B2 | 3/2018 | Hegde et al. |
| 9,965,726 | B1 | 5/2018 | Tablan et al. |
| 10,089,639 | B2 | 10/2018 | Kannan et al. |
| 10,467,339 | B1 | 11/2019 | Shen |
| 10,839,335 | B2 | 11/2020 | Weisman et al. |
| 11,165,900 | B2 | 11/2021 | Sachdev |
| 11,170,175 | B1 | 11/2021 | Kohli et al. |
| 11,475,210 | B2 | 10/2022 | De Oliveira et al. |
| 11,765,267 | B2 | 9/2023 | Cole et al. |
| 11,809,804 | B2 | 11/2023 | Láinez et al. |
| 11,941,348 | B2 | 3/2024 | De Oliveira et al. |
| 2002/0046018 | A1 | 4/2002 | Marcu et al. |
| 2007/0133437 | A1 | 6/2007 | Wengrovitz et al. |
| 2009/0030894 | A1 | 1/2009 | Mamou et al. |
| 2010/0104086 | A1 | 4/2010 | Park |
| 2010/0332477 | A1 | 12/2010 | Jeffs et al. |
| 2013/0007037 | A1* | 1/2013 | Azzam ............... G06F 16/3329 707/769 |
| 2014/0169547 | A1 | 6/2014 | Murgai |
| 2015/0032448 | A1 | 1/2015 | Wasserblat et al. |
| 2015/0046783 | A1 | 2/2015 | O'donoghue et al. |
| 2015/0106091 | A1 | 4/2015 | Wetjen et al. |
| 2015/0181020 | A1 | 6/2015 | Fitzsimmons et al. |
| 2015/0256677 | A1 | 9/2015 | Konig et al. |
| 2016/0092792 | A1* | 3/2016 | Chandrasekaran ........................ G06F 16/3344 706/12 |
| 2018/0113854 | A1 | 4/2018 | Vig et al. |
| 2018/0332165 | A1 | 11/2018 | Cunningham et al. |
| 2019/0121852 | A1* | 4/2019 | Applegate ........... H04L 12/1831 |
| 2019/0392837 | A1 | 12/2019 | Jung et al. |
| 2020/0279017 | A1 | 9/2020 | Norton et al. |
| 2021/0158805 | A1 | 5/2021 | Sivasubramanian et al. |
| 2021/0335367 | A1 | 10/2021 | Graff et al. |
| 2022/0067269 | A1 | 3/2022 | De Oliveira et al. |
| 2022/0156296 | A1 | 5/2022 | De Oliveira et al. |
| 2022/0210268 | A1 | 6/2022 | Cole et al. |
| 2022/0382959 | A1 | 12/2022 | Láinez Rodrigo et al. |
| 2022/0414319 | A1 | 12/2022 | De Oliveira et al. |
| 2023/0388413 | A1 | 11/2023 | Cole et al. |
| 2024/0020458 | A1 | 1/2024 | Láinez Rodrigo et al. |

OTHER PUBLICATIONS

"U.S. Appl. No. 17/447,039, Notice of Allowance mailed May 12, 2023", 11 pgs.
"U.S. Appl. No. 17/939,176, Non Final Office Action mailed Jun. 15, 2023", 8 pgs.
"U.S. Appl. No. 17/447,039, Non Final Office Action mailed Aug. 16, 2022", 10 pgs.
"U.S. Appl. No. 17/447,039, Examiner Interview Summary mailed Nov. 7, 2022", 2 pgs.
"U.S. Appl. No. 17/447,039, filed Nov. 16, 2022 to Non Final Office Action mailed Aug. 16, 2022", 11 pgs.
"U.S. Appl. No. 17/447,039, Final Office Action mailed Feb. 21, 2023", 11 pgs.
Ba, Jimmy Lei, "Layer Normalization", arXiv preprint, arXiv:1607.06450v1 [stat.ML], (Jul. 21, 2016), 14 pgs.
Celikyilmaz, Asli, "Deep Communicating Agents for Abstractive Summarization", arXiv preprint, arXiv:1803.10357v3 [cs.CL], (Aug. 15, 2018), 14 pgs.
Chopra, Sumit, "Abstractive Sentence Summarization with Attentive Recurrent Neural Networks", Proceedings of the NAACL-HLT16, (2016), 93-98.
Dai, "Semi-supervised Sequence Learning", arXiv preprint, arXiv:1511.01432 [cs.LG], (Nov. 4, 2015), 10 pgs.

Devlin, Jacob, "BERT: Pre-training of Deep Bidirectional Transformers for Language Understanding", arXiv preprint, arXiv:1810.04805 [cs.CL], (2018), 14 pgs.
Gehrmann, Sebastian, "Bottom-Up Abstractive Summarization", arXiv preprint, arXiv:1808.10792v2 [cs.CL], (Oct. 9, 2018), 12 pgs.
Gu, Jiatao, "Incorporating Copying Mechanism in Sequence-to-Sequence Learning", arXiv preprint, arXiv:1603.06393v3 [cs.CL], (Jun. 8, 2016), 10 pgs.
Holtzman, Ari, "The Curious Case of Neural Text Degeneration", 8th International Conference on Learning Representations (ICLR), (Apr. 2020), 16 pgs.
Howard, Jeremy, "Universal Language Model Fine-tuning for Text Classification", arXiv preprint, arXiv:1801.06146v5 [cs.CL], (May 23, 2018), 12 pgs.
Kingma, Diederik P, "Adam: A Method for Stochastic Optimization", arXiv preprint, arXiv:1412.6980v9 [cs.LG], (Jan. 30, 2017), 15 pgs.
Kudo, Taku, "SentencePiece: A simple and language independent subword tokenizer and detokenizer for Neural Text Processing", arXiv preprint, arXiv:1808.06226v1 [cs.CL], (Aug. 19, 2018), 6 pgs.
Li, Piji, "Actor-Critic based Training Framework for Abstractive Summarization", arXiv preprint, arXiv:1803.11070v2 [cs.CL], (Aug. 15, 2018), 10 pgs.
Lin, Chin-Yew, "ROUGE: A Package for Automatic Evaluation of Summaries", Text Summarization Branches Out: Proceedings of the ACL-04 Workshop, Barcelona, Spain., (2004), 8 pgs.
Liu, Peter J, "Generating Wikipedia by Summarizing Long Sequences", arXiv preprint, arXiv:1801.10198v1 [cs.CL], (Jan. 30, 2018), 18 pgs.
Lloret, Elena, "The Challenging Task of Summary Evaluation: An Overview", Author preprint, Language Resources and Evaluation, 52:1, 101-148, (2017), 54 pages.
Nallapati, Ramesh, "Abstractive Text Summarization using Sequence-to-sequence RNNs and", arXiv preprint, arXiv:1602.06023v5 [cs.CL], (Aug. 26, 2016), 12 pgs.
Narayan, Shashi, "Don't Give Me the Details, Just the Summary.", arxiv prepint, arixiv 1808.08745v1 cs.cl, (Aug. 27, 2018), 11 pages.
Paulus, Romain, "A Deep Reinforced Model for Abstractive Summarization", arXiv:1705.04304v3 [cs.CL], (Nov. 13, 2017), 12 pgs.
Peters, Matthew, "Deep contextualized word representations", Proceedings of the 2018 Conference of the North American Chapter of the Association for Computational Linguistics: Human Language Technologies, vol. 1 Long Papers, (2018), 11 pgs.
Radford, Alec, "Improving Language Understanding Generative Pre-Training", author preprint, (2018), 12 pgs.
Radford, Alec, "Language Models are Unsupervised Multitask Learners", author preprint, (2018), 24 pgs.
Rush, Alexander M, "A Neural Attention Model for Abstractive Sentence Summarization", arXiv preprint, arXiv:1509.00685v2 [cs.CL], (Sep. 3, 2015), 11 pgs.
Schluter, Natalie, "The limits of automatic summarisation according to ROUGE", Proceedings of the 15th Conference of the European Chapter of the Association for Computational Linguistics: vol. 2, Short Papers, (Apr. 3-7, 2017), 5 pgs.
See, Abigail, "Get To The Point: Summarization with Pointer-Generator Networks", arXiv preprint, arXiv:1704.04368v2 [cs.CL], (Apr. 25, 2017), 20 pgs.
Sennrich, Rico, "Neural Machine Translation of Rare Words with Subword Units", arXiv preprint, arXiv:1508.07909v5 [cs.CL], (Jun. 10, 2016), 11 pgs.
Sutskever, Ilya, "Sequence to Sequence Learning with Neural Networks", arXiv preprint, arXiv:1409.3215v3 [cs.CL], (Dec. 14, 2014), 9 pgs.
Tu, Zhaopeng, "Modeling Coverage for Neural Machine Translation", arXiv preprint, arXiv:1601.04811v6 [cs.CL], (Aug. 6, 2016), 11 pgs.
Vaswani, Ashish, "Attention is All You Need", 31st Conference on Neural Information Processing Systems (NIPS), arXiv:1706.03762v5 [cs.CL], (Dec. 6, 2017), 15 pgs.
Vinyals, Oriol, "Pointer Networks", arXiv preprint, arXiv:1506.03134v2 [stat.ML], (Jan. 2, 2017), 9 pgs.

(56) References Cited

OTHER PUBLICATIONS

Wu, Yonghui, "Googles Neural Machine Translation System: Bridging the Gap between Human and Machine Translation", arXiv preprint, arXiv:1609.08144v2 cs.CL, (Oct. 8, 2016), 23 pgs.

Zeng, Wenyuan, "Efficient Summarization with Read-Again and Copy Mechanism", arXiv preprint, arXiv:1611.03382v1 [cs.CL], (Nov. 10, 2016), 11 pgs.

"U.S. Appl. No. 17/304,081, Notice of Allowance mailed Jun. 9, 2022", 9 pgs.

"U.S. Appl. No. 17/304,081, Notice of Allowability mailed Jul. 20, 2022", 2 pgs.

"Application Serial No. 17 303,279, Notice of Allowance mailed Aug. 24, 23", 11 pgs.

"Application Serial No. 17 939, 176, Response filed Sep. 14, 23 to Non Final Office Action mailed Jun. 15, 23", 8 pgs.

"Application Serial No. 17 305,976, Non Final Office Action mailed Sep. 21, 23", 17 pgs.

"Application Serial No. 17 939,176, Notice of Allowance mailed Nov. 8, 23", 8 pgs.

Efstathiou, "Semantic Source Code Models Using Identifier Embeddings", IEEE Acm 16th International Conference on Mining Software Repositories (MSR), (2019), 29-33.

U.S. Appl. No. 18/448,675, filed Aug. 11, 2023, Tool for Annotating and Reviewing Audio Conversations.

U.S. Appl. No. 18/373,450, filed Sep. 27, 2023, Text Formatter.

"U.S. Appl. No. 17/305,976, Examiner Interview Summary mailed Dec. 12, 2023", 2 pgs.

"U.S. Appl. No. 17/305,976, Final Office Action mailed Jan. 9, 2024", 19 pgs.

"U.S. Appl. No. 17/305,976, filed Dec. 14, 2023 to Non Final Office Action mailed Sep. 21, 2023", 13 pgs.

"U.S. Appl. No. 17/939,176, Supplemental Notice of Allowability mailed Feb. 21, 2024", 3 pgs.

"U.S. Appl. No. 17 305,976, Response filed Mar. 6, 2024 to Final Office Action mailed Jan. 9, 2024", 13 pgs.

"U.S. Appl. No. 18/448,675, Non Final Office Action mailed Mar. 12, 2024", 8 pgs.

"U.S. Appl. No. 17/305,976, Non Final Office Action mailed Mar. 26, 2024", 18 pgs.

\* cited by examiner

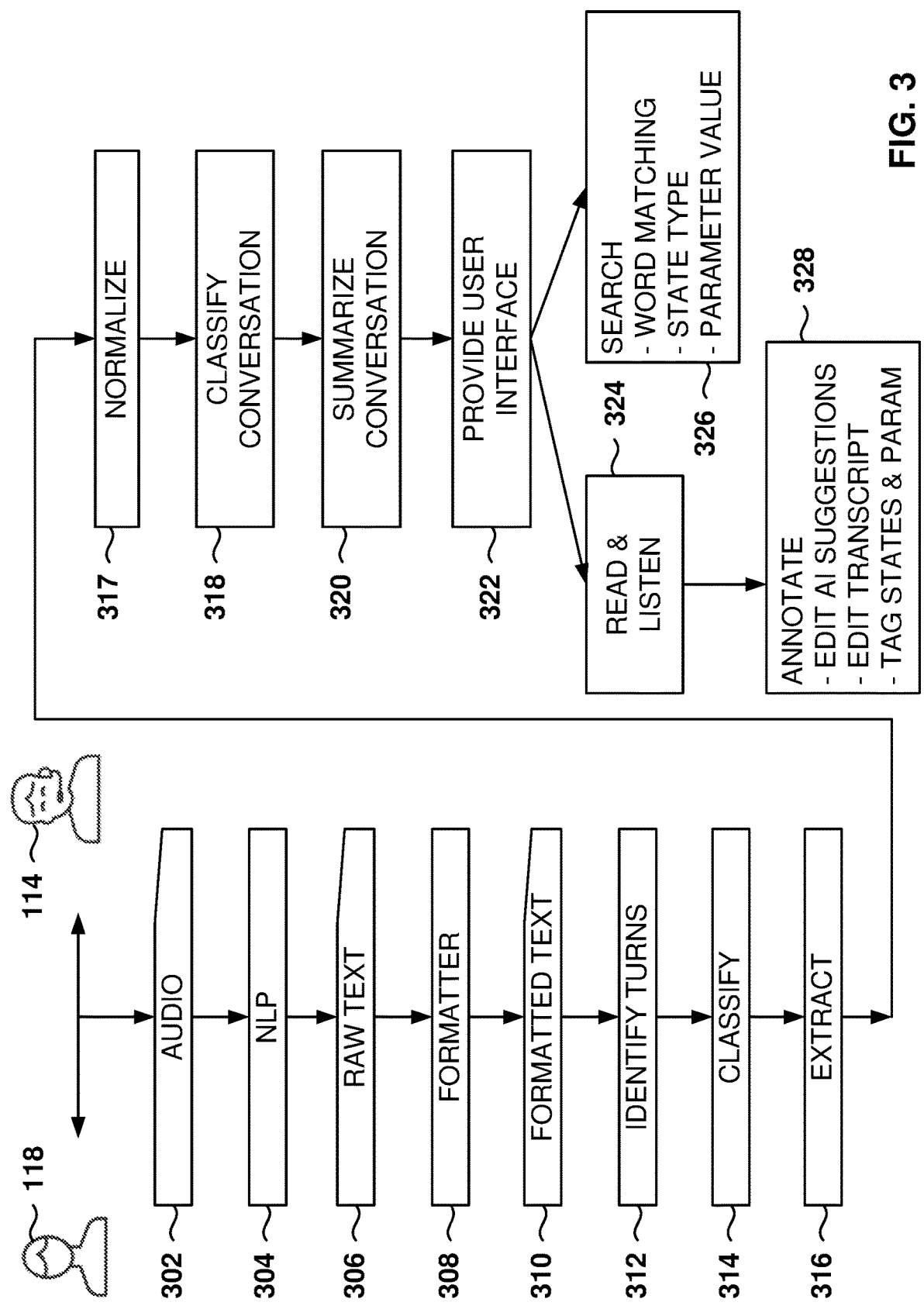

| FIND KEYWORDS AND PHRASES | 🔍 | GUIDELINES |

SID: GT9BB1C02412A592D2266I5CD729EBD2287

CHECKLIST
ANNOTATIONS
NAMEAGENT X1   2
NOTICENUM X2   0
RECORDING X3   1
DEPENDENTS X4  0
PROFANITY. X5  0

NOTICE NUMBER
[VAB00000000] ⊖
CALL OUTCOME
[SELECT OUTCOME ˅]
CALL SENTIMENT
[SELECT SENTIMENT ˅]

[COMPLETE]

NAME AGENT

1 OF THE LEADING LIFE INSURANCE SERVICES IN AMERICA AND HELP OVER 10000 PEOPLE EACH MONTH ON THE RIGHT POLICY. I [INAUDIBLE] PERSONALIZED PLAN. THE MESSAGES. YOU NEED SOME BUDGET. AS I SAID, MY NAME IS [BRITTNEY] I'M A SENIOR LICENSE AGENT THAT SPECIALIZES IN YOUR AREA, AND MY JOB IS JUST BE YOUR ADVOCATING GUIDE. YOU TO THE RIGHT PLAN BASICALLY NEEDS FOR LIFE INSURANCE. NOW, ARE YOU LOOKING AT RATES FOR YOURSELF? OR DID YOU NEED COVERAGE FOR OTHERS AND YOUR FAMILY AS WELL?

CUSTOMER | YES. MYSELF.
0:01:26

AGENT   | OKAY, AND LET ME SEE HERE. ARE YOU CURRENTLY EMPLOYED? RETIRED ON SOCIAL SECURITY
0:01:28 | DISABILITY?

CUSTOMER | OH GOD [INAUDIBLE] QUESTIONS AGAIN. I ALREADY ANSWERED THEM TWICE.
0:01:36

AGENT   | OKAY, DID YOU ALREADY?
0:01:41

CUSTOMER | I'M RETIRED.
0:01:42

AGENT   | OKAY, I'M SORRY ABOUT THAT. OR DID YOU ALREADY SPEAK WITH SOMEBODY?
0:01:44

CUSTOMER | WELL, 1 PERSON CALL ME IN THE MIDDLE OF ME FILLING OUT THE APPLICATION ONLINE. I COULDN'T
0:01:46  | FINISH THAT. THEN SHE TOOK ALL THE INFORMATION. THEN SHE TRANSFER IT TO SOMEBODY ELSE. AFTER
         | SHE MADE ME WAIT, AND THEN THE SECOND 1 TOOK THE INFORMATION AGAIN AND SHE MADE ME
         | WAIT EVEN LONGER. AND NOW HERE WITH YOU. YOU'RE S. CAN YOU SAY QUESTIONS?

FIG. 5

EXAMPLE : LITERAL SPOT

CLASSIFY: SEARCH LIST OF GIVEN TERMS: "RECORDED LINE," "RECORDED CALL," ...

EXTRACT: SEARCH LIST OF GIVEN TERMS: "RECORDED LINE," "RECORDED CALL," ...

1202

| TRANSCRIPT | MATCH | EXTRACTED |
|---|---|---|
| Hi, my name is John and this is insurance co., we are on a recorded call | YES | "recorded call":RecordingMention |
| Hi, I'm Lesley and I'm looking for insurance | NO | |
| Totally, I can help. Let me tell first I'm a licensed agent and I'll guide you through the process. Also, I specialize in the state of California. | NO | |

FIG. 12

EXAMPLE : IDENTIFIER

CLASSIFY: PASSTHROUGH, EVERY SENTENCE MATCHES, ALWAYS EXTRACT

EXTRACT: ENTITY RECOGNITION MODEL TO ID CUSTOMER IDS

NORMALIZE: (OPTIONAL) USE HEURISTICS OR MODEL

1302

| TRANSCRIPT | MATCH | EXTRACTED |
|---|---|---|
| Yes, I'm interested in insurance | NO | |
| That's great. Can I get your customer id? | NO | |
| Yes, it is A A C 1 2 3 4 5 V | YES | "A A C 1 2 3 4 5 V": Customerid Normalizer: -> "AAC12345V" |

FIG. 13

EXAMPLE : SEMANTIC SPOT

| CLASSIFY: SEARCH, SEMANTIC MATCHING ON GIVEN PHRASES: "HEALTHCARE DECISIONS" |
|---|
| EXTRACT: SEARCH, EXTRACT SEMANTICALLY EQUIVALENT TERMS TO THE ONES SEARCHED |

1402

| TRANSCRIPT | MATCH | EXTRACTED |
|---|---|---|
| ... | NO | |
| So Philip, wanted to ask, do you make your own medical choices at home? | YES | "medical choices":HealthcareDecisionsMention |
| Yes, I do | NO | |

FIG. 14

EXAMPLE: QUESTION AND ANSWER

QUESTION CLASSIFY-EXTRACT 1502

| TRANSCRIPT | MATCH | EXTRACTED |
|---|---|---|
| Are you familiar with our loans, Mr. Smith? | NO | |
| I'm actually pretty happy with my current loan | NO | |
| Can I ask what are the conditions of your loan? | YES | |
| Ehm, sure. They gave me a 3 percent interest rate | NO | |
| I see, I see. For how long? | NO | |
| Mhh, for 3 years I think it was | NO | |

ANSWER: RUN ANSWER CLASSIFY-EXTRACT ON FOLLOWING N SENTENCES 1504

| TRANSCRIPT | MATCH | EXTRACTED |
|---|---|---|
| Ehm, sure. They gave me a 3 percent interest rate | YES | "3 percent": LoanInterestRate |
| I see, I see. For how long? | NO | |
| Mhh, for 3 years I think it was | YES | "3 years": LoanDuration |

FIG. 15

TOOL FOR CATEGORIZING AND EXTRACTING DATA FROM AUDIO CONVERSATIONS

CROSS-REFERENCE TO RELATED APPLICATIONS

This application claims the benefit of U.S. Provisional Application No. 63/145,120, filed Feb. 3, 2021, entitled "Tool for Categorizing and Extracting Data from Audio Conversations;" U.S. Provisional Application No. 63/115,211, filed Nov. 18, 2020, entitled "Transition-Driven Search;" and U.S. Provisional Application No. 63/133,070, filed Dec. 31, 2020, entitled "Tool for Annotating and Reviewing Audio Conversations." These provisional applications are herein incorporated by reference in their entirety.

TECHNICAL FIELD

The subject matter disclosed herein generally relates to methods, systems, and machine-readable storage media for techniques to search and analyze audio conversations.

BACKGROUND

Contact centers have operators that provide support to clients, sometimes via voice or video conversations that may be recorded for future use, such as to improve quality or determine if something went wrong during the conversation. Often, the audio of the conversations is transcribed to text so text searches may be performed.

However, some contact centers may record thousands of conversations a day, so trying to perform searches on the conversations is tedious and time-consuming. Further, finding the right conversations may be difficult since straight text searches may not be useful to find an item, such as, "Did the customer become unhappy during the conversation?" or "Did the agent provide her name?"

Some companies have reviewers that spend time listening to the conversations, but this process is expensive, prone to errors, and typically limited to a small subset of all the available conversations.

What is needed are flexible tools that can analyze conversations and enable users to provide feedback on the content of the conversation.

SUMMARY

An Engagement Intelligence Platform (EIP) is a system that facilitates the easy and automatic analysis of conversations for customer interactions. The EIP enables companies and developers to unlock the untapped troves of customer insight, compliance violations, and coaching opportunities that exist in every conversation.

The EIP analyzes transcripts of conversations to find different states and information associated with each of the states (e.g., interest rate quoted in the value of the interest rate). With transition-driven search, instead of searching for a word or a text string, the system enables search parameters associated with the states of the conversation and linkages between the states (e.g., asked if a user smokes, respond as yes, no, maybe).

The EIP includes a framework for classifying sentences in the conversation according to the state associated with the sentence (e.g., a given sentence includes the agent giving her name to the customer). Further, information is extracted for certain states (e.g., in a state identified for providing an interest rate, the extraction process extracts the value of the interest rate cited to the customer). Further yet, in some cases, the extracted data is normalized to convert it to a predefined format (e.g., an interest rate extracted as "five point one percent" is converted to an integer value of 0.051).

BRIEF DESCRIPTION OF THE DRAWINGS

Various of the appended drawings merely illustrate example embodiments of the present disclosure and cannot be considered as limiting its scope.

FIG. 3 is a sample flow diagram showing the use of different tools for conversation analysis and review, according to some example embodiments.

FIG. 4 is an image of a user interface (UI) that includes options for tagging sections of the conversation, according to some example embodiments.

FIG. 5 is an image showing how to attach a name embedded in the conversation utilizing a pull-down menu with options for the configured tags, according to some example embodiments.

FIG. 12 is an example of a classify-extract operation using literal spotting, according to some example embodiments.

FIG. 13 is an example of a classify-extract operation to obtain an identifier value, according to some example embodiments.

FIG. 14 is an example of a classify-extract operation using semantic spotting, according to some example embodiments.

FIG. 15 is an example of a question-answer sequence detection, according to some example embodiments.

DETAILED DESCRIPTION

Example methods, systems, and computer programs are directed to classifying sentences of audio conversations according to predefined categories and extracting information embedded within the sentences. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One general aspect includes a method that includes an operation for accessing a transcript of a conversation, the transcript including text for a plurality of sentences. Further, the method includes classifying, by a first machine-learning (ML) model, each sentence from the plurality of sentences to determine if the sentence is associated with a predefined state. For each sentence associated with the predefined state, a second ML model extracts a parameter value associated with the predefined state. Further, the method includes operations for storing the classification of the states for the transcript and the extracted parameter values, and for causing presentation of a user interface (UI) with an option to search transcripts based on the identified predefined state or the extracted parameter values.

Figure 1:
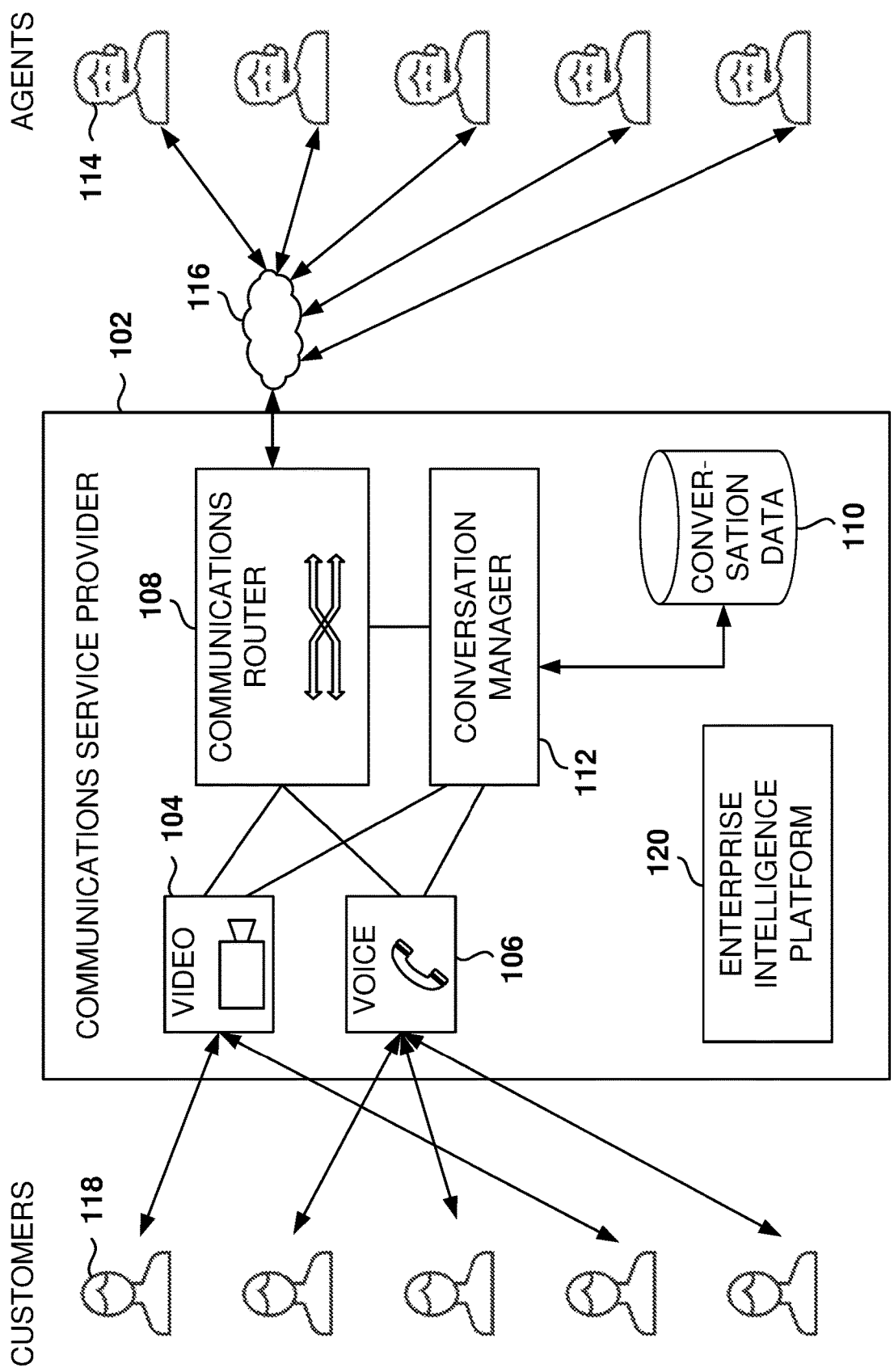
FIG. 1 is a representative diagram showing an architecture of a communications service provider that provides call center services, according to some example embodiments.

FIG. 1 shows an architecture of a communications service provider that provides contact center services, according to some example embodiments. In some example embodiments, a communications service provider 102 provides call-center services to facilitate voice and data communications between devices of customers 118 and agents 114.

The agents 114 may work for a plurality of companies that use the services of the communications service provider 102. The customers 118 may establish video and voice conversations to communicate with the agents 114, such as for requesting support for a product of service.

The customers 118 and agents 114 communicate with the communications service provider 102 via direct connections or through a network 116, such as the Internet or a private network connection.

When a customer 118 requests a video or voice communication with the company, the communications service provider 102 routes the video or voice communications to one of the agents 114 from that company. When an agent 114 initiates the call, a conversation manager 112 routes the call to the customer 118.

During the conversation, a conversation manager 112 records the conversations (e.g., voice data) in a database 110 of the communications service provider 102.

Additionally, the communications service provider 102 includes a video processor 104 that processes video calls, a voice processor 106 that processes voice calls, and a communications router 108 that routes the communication data between customers 118 and agents 114.

The conversation manager 112 manages the conversations, such as establishing, monitoring, and terminating conversations, as well as managing the storage of conversation data when requested by the client.

The clients may use the conversation data to manage, monitor, and improve operations, such as to monitor for compliance by an agent or to determine when a follow up call is requested to further a sales process.

The Enterprise Intelligence Platform (EIP) 120 is a program that analyzes spoken and written customer interactions and provides programmable customization tools for customers to tag, edit, analyze, classify, extract information, and search the data from the spoken and written customer interactions.

Figure 2:
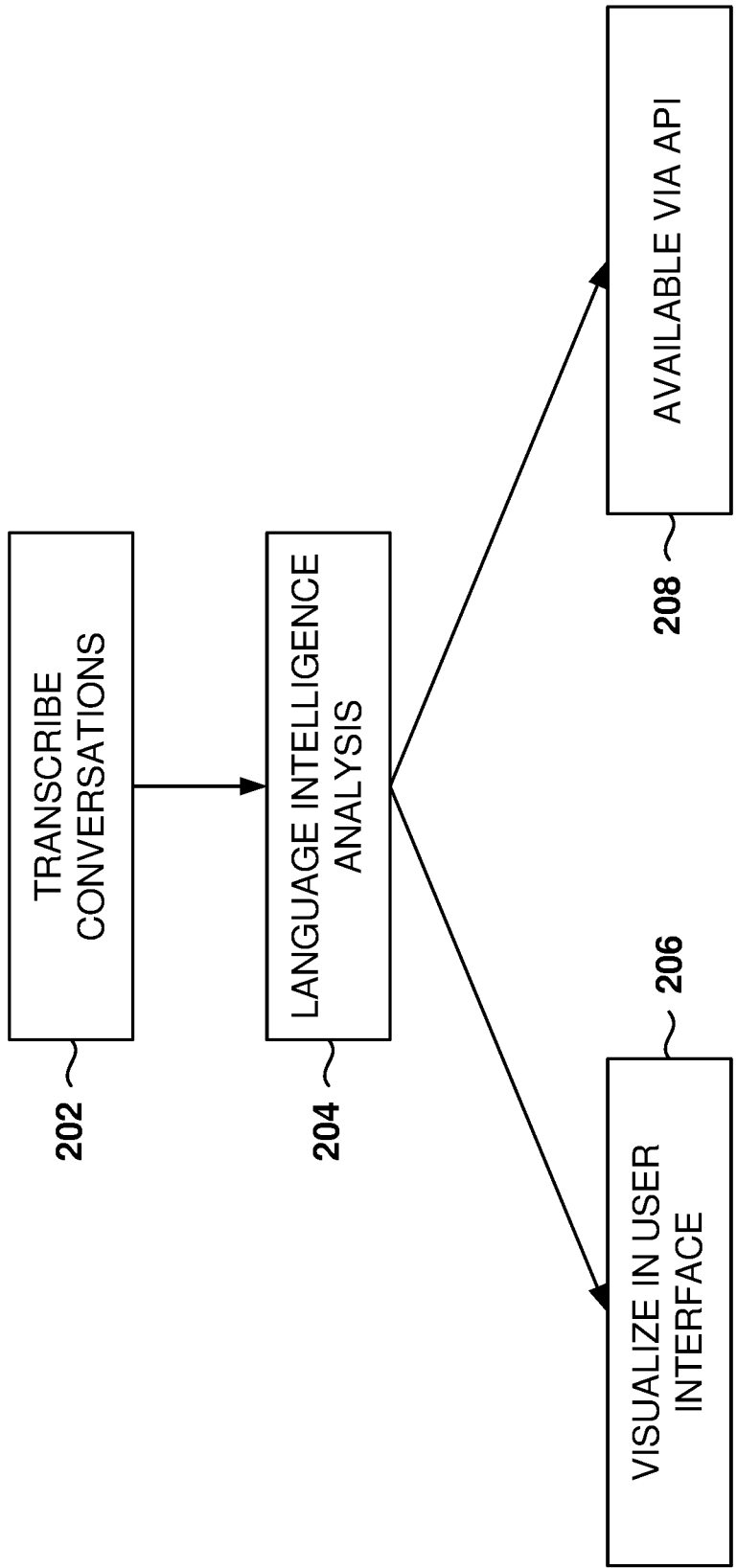
FIG. 2 is a flow diagram showing, at a high level, the conversation tools available for search and review, according to some example embodiments.

FIG. 2 shows, at a high level, the conversation tools available for search and review, according to some example embodiments. The EIP 120 includes tools for transcribing conversations 202, analyzing 204 language within the conversations, and visualizing 206 the results from the analysis in the user interface. The EIP 120 also provides tools for search and for accessing the conversation data via an Application Programming Interface (API) 208.

In some example embodiments, the analysis of the conversation includes identifying sections of the conversation associated with a configured event, with each event associated with a corresponding label, also referred to as tag or annotation. The user may then search by label, add labels, delete labels, and so forth.

In some example embodiments, the EIP analyzes the conversation data offline; that is, the EIP is not active in trying to guide the conversation, although, in some example embodiments, the EIP may also analyze data in real-time to provide real-time information.

Transition-driven search refers to the ability to search conversation data based on the natural turns in the conversation between the two participants and based on an analysis of the content within each turn and how multiple turns relate to each other, such as when multiple turns refer to the same topic (e.g., agent providing their name to the caller).

By using labels, EIP provides great flexibility for searching through thousands of conversations to find events that would be almost impossible to find through standard text searches, or it would require a large amount of time to scan through all the conversations. For example, a label may indicate that an interest rate for a loan was quoted, but since there are multiple ways to verbally provide an interest rate (e.g., "I can do 2.5"), sometimes without even saying the words "interest" or "rate," it may be impossible to find all instances when an interest rate was quoted just by searching for the words "interest" and "rate."

FIG. 3 is a sample flow showing the use of different tools for conversation analysis and review, according to some example embodiments. While the various operations in this flowchart are presented and described sequentially, one of ordinary skill will appreciate that some or all of the operations may be executed in a different order, be combined or omitted, or be executed in parallel.

At operation 302, the audio of the conversation is captured, and at operation 304, Automatic Speech Recognition (ASR), also referred to as Speech To Text (STT), is used to analyze the audio of the conversation to generate the raw text 306. The raw text 306 is a list of words identified in the conversation, without including commas, periods, or any other punctuation marks that help identify sentences within the conversation.

The formatter 308 takes the raw text 306 and formats the text into plain English sentences, such as by dividing the raw text 306 into sentences, adding periods and commas, capitalizing beginning of sentences and proper names, and so forth. The result is formatted text 310.

After the formatted text 310 is available, the turns in the conversation are identified at operation 312, where each turn represents the words spoken by one of the parties without interruption by the other party.

Identifying turns 312 (e.g., identifying a question and a corresponding answer) is not a simple proposition because it involves more than just identifying two turns within the conversation. Sometimes, it may take several turns to ask a question and get an answer. For example, there are several types of questions that cause some people to be reluctant to respond, and it might take several turns of restating the question to get a clear answer, such as asking if the caller is a smoker.

Further, the exact words used to ask the question do not matter, as long as the question is asked. Therefore, the machine-learning (ML) model may have to be able to identify multiple ways of asking the same question as a simple text search may fail.

At operation 314, the EIP classifies the turns within the conversation, also referred to as identifying the state of each turn, where each state refers to a segment of the conversation associated with a single topic (e.g., providing the name of the party, quoting a price for a good, obtaining contact information, etc.). Each state is associated with a corresponding label. A state may include one or more turns, because a participant may require multiple turns to provide certain information (e.g., one turn providing name as "John," agent asking for full name, customer providing "John Doe").

Further, at operation 316, one or more of the identified states are analyzed to extract a parameter value. For example, for a state where a name is provided, the name is extracted; for a phone-number state, the phone number is extracted; for a quote of an interest rate, the interest rate is extracted; for a state where the client identifies if the client is a smoker, smoker or no smoker is extracted, and so forth. In some example embodiments, an ML model is used to extract the parameters, but other embodiments may used other methods, such as heuristics, string searches, and the like.

At operation 317, the extracted values are normalized. It is noted that operation 317 is optional and is used for some of the extracted data. The normalization includes converting the extracted value (e.g., a text string) to a predefined format (e.g., integer value, string without spaces).

At operation 318, the conversation is classified according to one from a plurality of possible classification values that identify outcomes of the classification. For example, the classification values may include a positive outcome, a neutral outcome, or a negative outcome. In another example, the classification values may include a sale was made or a sale was not made.

At operation 320, a summary of the conversation is created. In some example embodiments, the summary is a textual abstract of the content of the conversation. In some example embodiments, the summary is generated by an ML model.

At operation 322, a user interface is provided to the user, where the user interface includes multiple options for examining conversations, including reading and listening to the conversations 324 and performing searches 326. The user interface provides an option to annotate 328 (e.g., add labels) the conversation, such as to edit the suggested labels generated by the AI models, edit the transcript suggested by the NLP, tag the states, and validate values of identified parameters.

The search 326 may be of different kinds, such as word matching (e.g., word search), search by state type (e.g., agent identified herself), or by parameter value (e.g., caller lives in California), or a combination thereof.

FIG. 4 is a UI 400 that includes examples of options for tagging sections of the conversation, according to some example embodiments. The UI 400 is referred to herein as the annotator UI and presents the transcript of the conversation for efficiently listening and reviewing conversations, seeing related annotations, which may be generated by a user or the ML model, and providing the ability to tag the conversation.

Tagging, referred to herein as annotating, includes identifying states or parameters within the conversation, such as a username, and assigning the state to the corresponding label. In some example embodiments, the user is able to create custom labels, such as labels indicative of an agent name, a statement that the conversation is recorded, a use of profanity, and so forth. Once the custom labels are created, the user is able to quickly select a piece of text and then associate the selected text with one of the labels. For example, after selecting a piece of text, the user may select from one of the custom labels presented by the UI 400 to associate the label to the selected text In some example embodiments, the complexity of analyzing conversations is greatly reduced by limiting the analysis to identify those labels created by the client. Instead of having to analyze millions of possible labels in an open-ended conversation, the system only has to identify from a plurality of possible labels. This reduction of complexity may be very useful as, for example, conversations in a support center tend to be very similar and deal with a limited set of possible items. Further, the user may also be concerned with certain parameters and not everything that was said. For example, beginning casual conversation talking about the weather may be of little interest for analyzing the content of the conversation.

In addition, some of the labels may be common for multiple users, or for users within the same industry, and the EIP system provides a dictionary of common labels to let the user select from the dictionary to be able to build up the custom EIP solution.

Further, the annotator UI allows the user to listen to the actual conversation and, as the audio progresses, the text of the conversation is highlighted. Further, some of the words of the conversation may not be clear for the NLP processor, so words with a low confidence score are highlighted (e.g., presented in a different color font) so the user can correct them if necessary.

Figure 5:
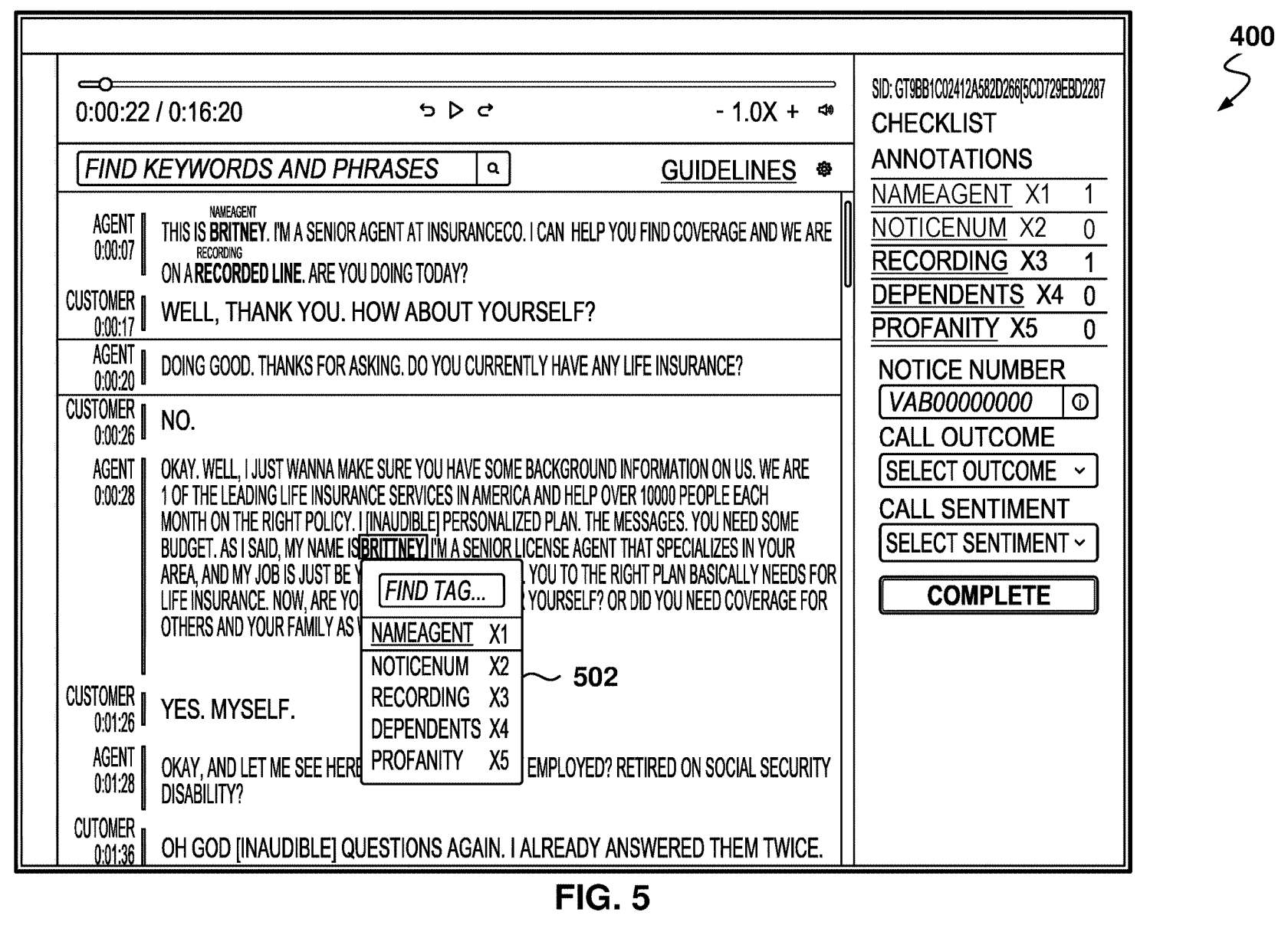

FIG. 5 shows how to attach a name embedded in the conversation to an annotation utilizing a pull-down menu with options for the configured tags, according to some example embodiments. Annotating an entry is easy using the UI 400. The user selects a piece of text (e.g., one or more words) and then right clicks on the selection. Menu 502 then is presented with a list of the predefined labels.

If the user selects one of the label options, then the selected text is associated with the label. In the illustrated example of FIG. 5, the user has selected the word "Britney." After the right click, the options are presented, and the user may select the label NameAgent associated with the state where the agent provides their name.

In some example embodiments, an option is provided to add a new label, and the user may associate the selected test with a newly created label. In the illustrated example, the client has the compliance requirement that the agent states that the conversation is on a recorded line.

Another requirement is that the agent states that the agent is licensed. However, sometimes the agents do not say the word "license," such as saying, "I'm a senior agent." This creates problems when performing searches to determine when agents say that they are licensed by the state.

Consistent labeling is important because it allows analysis of the data across many scenarios, such as agents in different geographies or using different languages. The consistent labeling may then be used by ML models to analyze the data, generate better training sets, and perform better predictions, including the tagging task.

In some example embodiments, small tasks may be assigned to agents based on their conversations, such as, "Was this conversation tagged properly?" The human feedback is then used to assess the performance of the ML model that tags the conversations.

In some example embodiments, the annotator UI 400 includes the list of tags, and the user can select any of the tags to see where the tag is used in the conversation.

Figure 6:
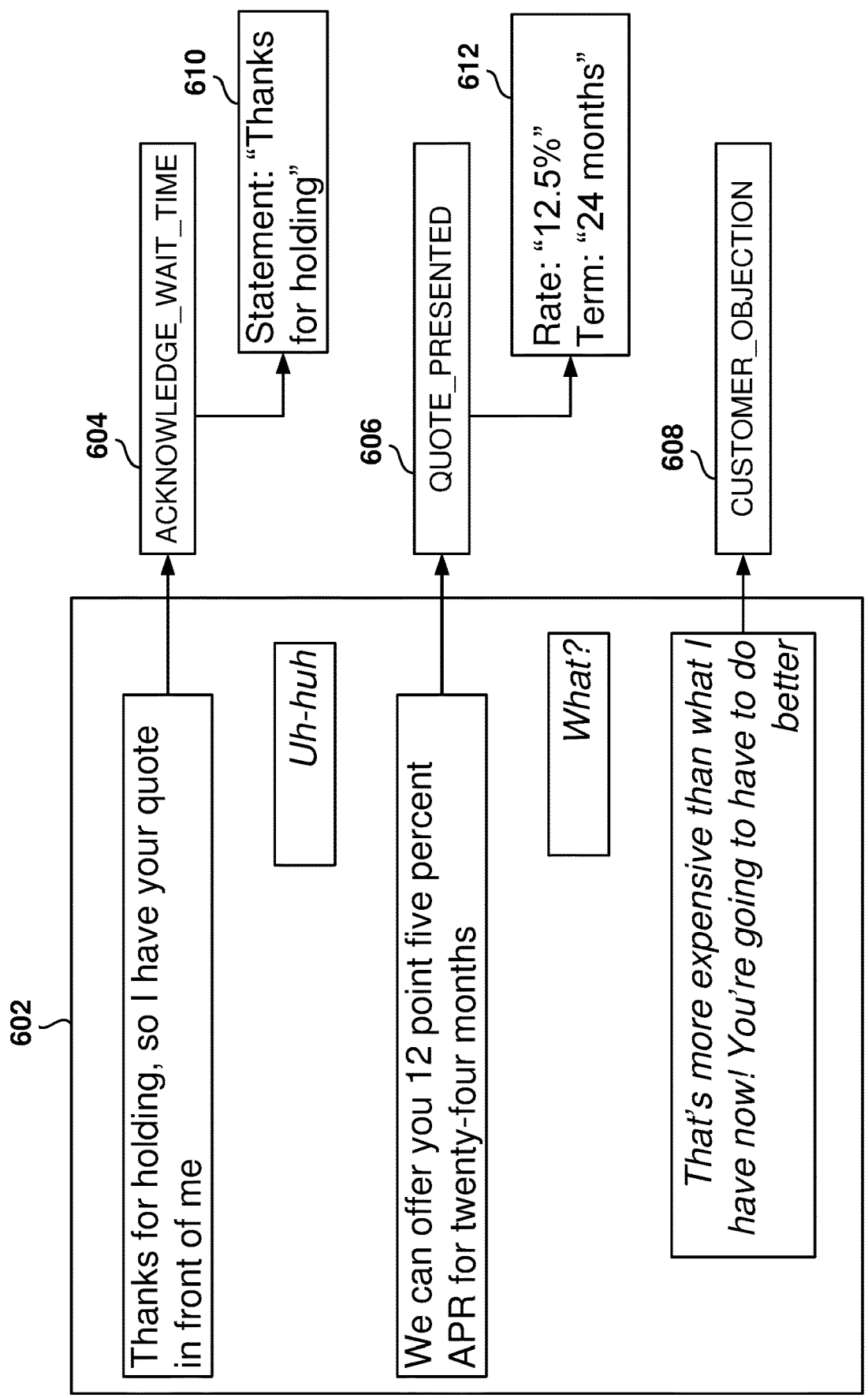
FIG. 6 is a diagram illustrating the detection of states and the extraction of parameter values within the state, according to some example embodiments.

FIG. 6 illustrates the detection of states and the extraction of parameter values within the states, according to some example embodiments. In the illustrated example, a portion of the conversation is presented in window 602.

The first turn in the conversation includes a message, "Thanks for holding, so I have your quote in front of me." This turn is associated with the state 604 ACKNOWLEDGE_WAIT_TIME for acknowledging the wait time. Further, the parameter 610 value "Thanks for holding" is extracted.

In the next turn, the text includes, "We can offer you 12 point five percent APR for twenty-four months," and the corresponding state 606 is for presenting the quote QUOTE_PRESENTED. Associated with state 606 are the parameter values 812 for rate as 12.5% and for term as 24 months.

The next turn includes the utterance "What," which is not associated with any annotated state. The next line reads, "That's more expensive than what I have now! You're going to have to do better." This line is associated with the state 608 for a customer objection CUSTOMER_OBJECTION.

By identifying the states and extracted parameters, the search within conversations is much easier and provides abilities that would be almost impossible with simple text searching.

In some example embodiments, this process is referred to as the classify-extract flow. A classify-extract flow includes a classify step that identifies which sentences to analyze, and an extract step, which finds the span or spans of interest within the identified sentences. A benefit of the classify-extract flow as a model framework is that it is generic enough to satisfy a whole realm of desired state-recognition areas to turn unstructured utterances into structured and extracted data.

Figure 7:
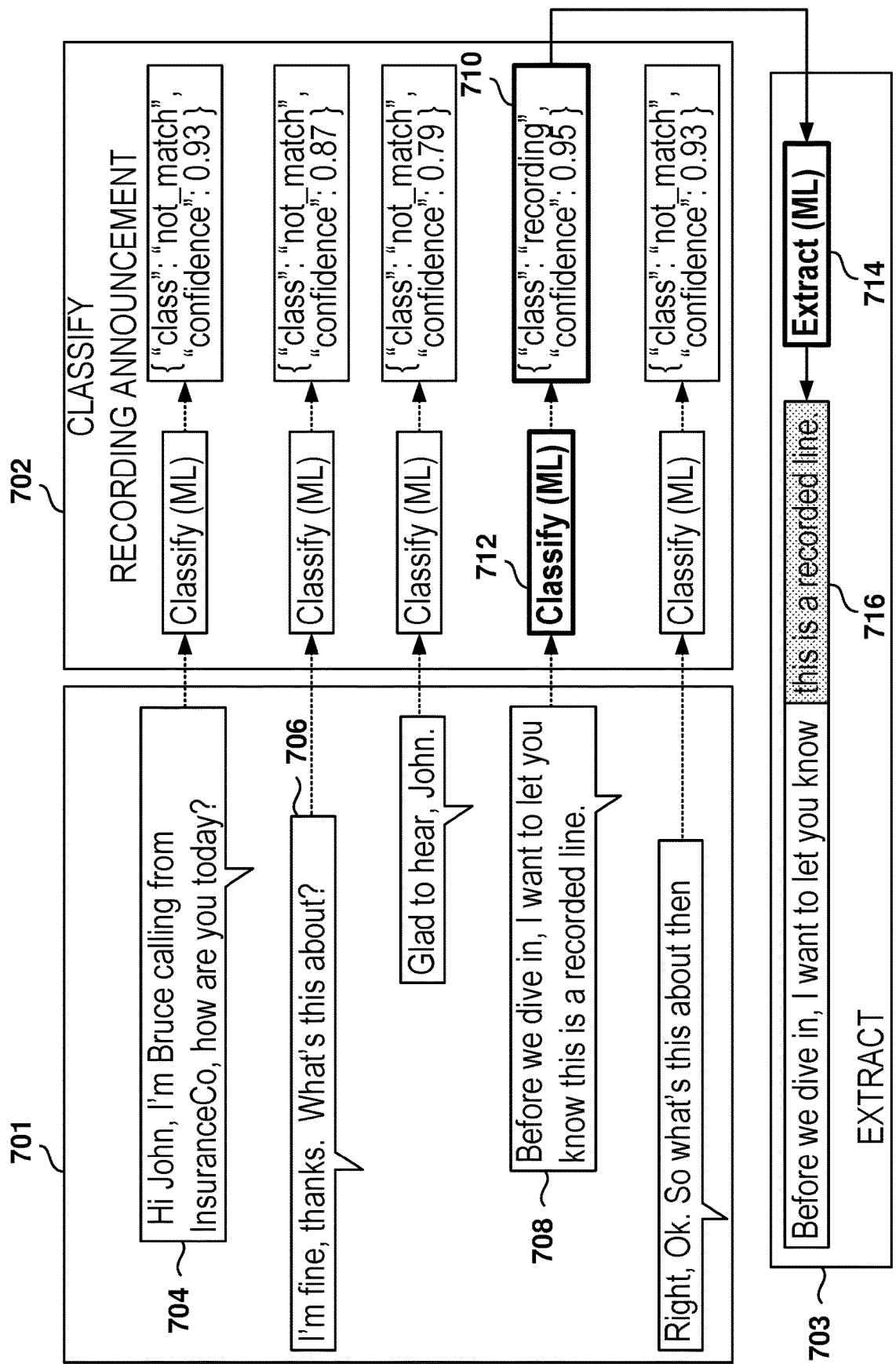
FIG. 7 illustrates the classify-extract process, according to some example embodiments.

FIG. 7 illustrates the classify-extract process, according to some example embodiments. The classify-extract feature provides a generic framework for turning unstructured conversation utterances into structured, extracted data. As discussed above, there framework includes two operations. The first operation is the classify operation 702, to search for sentences that match a condition of interest. The extract operation 703 is to retrieve spans of interest in a matching sentence. The framework is customizable and can be configured for many types of states and extract operations.

In the example illustrated in FIG. 7, a classify ML model 712 is used to classify each of the turns 704, 706, 708 in the conversation 701 to detect a predefined state, and in this case, that state corresponds to notifying the customer that the conversation is being recorded.

It is noted that in this example, the state may be found when the agent provides the information; therefore, it is not necessary to analyze the turns from the customer. Alternatively, the turns of the customer could be analyzed, but they would always return that a match has not been found.

In the illustrated example, the classify operation 702 includes analyzing all the turns by a classify ML model 712 which returns the name of the state (e.g., "not_match" when a match is not found, "recording_disclosure" when a match is found) and a confidence level (e.g., 0.95, which is a score assigned by the model), where the higher the score the more probable that the match has been made. In some example embodiments, a predefined threshold is configurable by the system administrator to determine when a match is considered to be made (e.g., a match is considered to be positive when the confidence level exceeds 0.9). In some example embodiments, the confidence level is a real number between zero and one, but other values scales or classifications may be utilized.

The classify ML model 712 analyzes the text and determines if the desired condition is met. There may be several ways to say that the conversation is being recorded, and the classify ML model 712 is able to detect the multiple formats for declaring that the conversation is being recorded.

Input turn 708 is the sentence "Before we dive in, I want to let you know that this is a recorded line." Given this input turn 708, the classify ML model 712 produces output 710, which includes the state name recording disclosure and the confidence level 0.95.

In some example embodiments, the extract operation 703 includes using an extract ML model 714 for the detected state or states in the classify operation 702. The input to the extract ML model 714 is the turn 708 and the output 710 of the classify ML model 712. The output of the extract model 714 is a text string 716 that corresponds to the match within the turn where the message was conveyed, and in this case, the match is "this is a recorded line."

Using the classify-extract framework helps solve many contact-center use cases at the sentence level in a flexible way. Transcripts can be very long, and it is difficult to run some models on all that content. Additionally, it may be expensive to extract particular data without the classification step as it requires deep language analysis of the conversation. Further, the classify-extract framework is a step forward in letting customers be self-sufficient, without having to always rely on the service provider for extracting information from conversations. For example, customers can set up a state to make sure that agents provide their name, and another state to extract the customer account identifier provided by the client. The account identifier may be provided in multiple ways, such as by spelling numbers and characters, providing a straight number, a number may be presented as a number itself or be written in text format (e.g., 5 vs. five, 12 point four vs. 12.4), using words to convey initials, etc. The extract operation 703 is able to extract all these values, even when presented in different formats, and the normalize operation is able to convert all these values into a standard format that is easy to use via computer (e.g., for a database search based on customer identifier).

Figure 8:
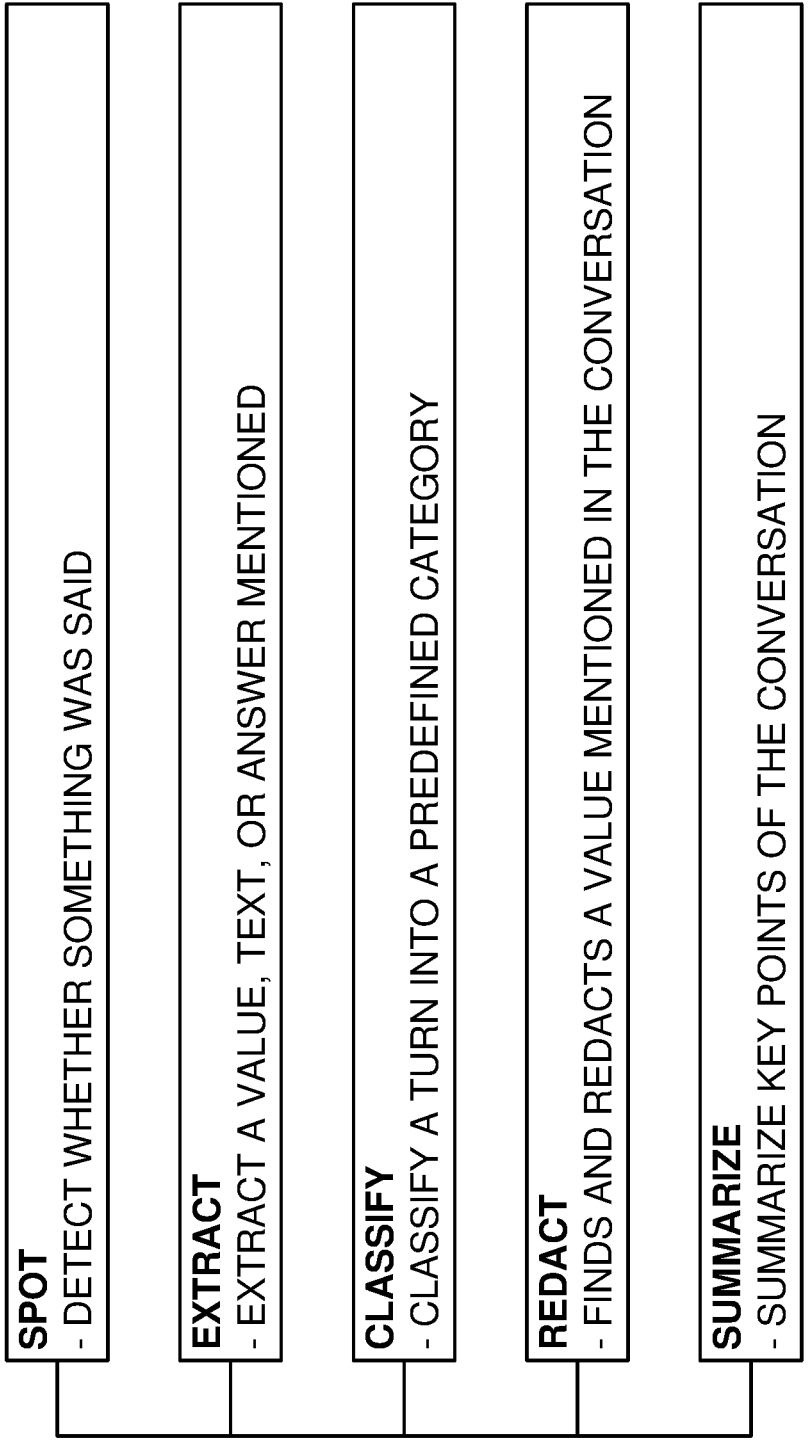
FIG. 8 is a flow chart illustrating five of the primitives used to understand conversations, according to some example embodiments.

FIG. 8 illustrates five of the primitives used to understand conversations, according to some example embodiments. As used herein, primitives refer to programs offering respective functionality with regards to conversation analysis.

In some example embodiments, the primitives include spot, extract, classify, redact, and summarize. The spot primitive detects whether something was said in the conversation, such as finding particular words of interest. The extract primitive extracts information from the conversation, such as a parameter value, one or more words, or the answer to a question.

The classify primitive classifies a conversation to find the turns within the conversation. The redact primitive finds and redacts a parameter value mentioned in the conversation.

Further, the summarize primitive provides a summary of the key points from the conversation, such as an abstract of a text document.

The different primitives may be combined to perform the conversation analysis, such as using the classify primitive to find annotations within the conversation and the extract primitive to find parameter values within the identified annotations.

In some example embodiments, multiple ML models may be defined to implement the primitives. For example, one ML model may be used to identify the terms within the conversation, and once a particular annotation is provided (e.g., name stated), a model is used to find the name in the turn.

In some example embodiments, a Q&A primitive is used for finding turns in a conversation that include a question and a corresponding answer. It is noted that it may take multiple turns in the conversation to state a question or to obtain the answer; therefore, the Q&A primitive may look beyond simply observing pairs of turns for questions and answers.

Figure 9:
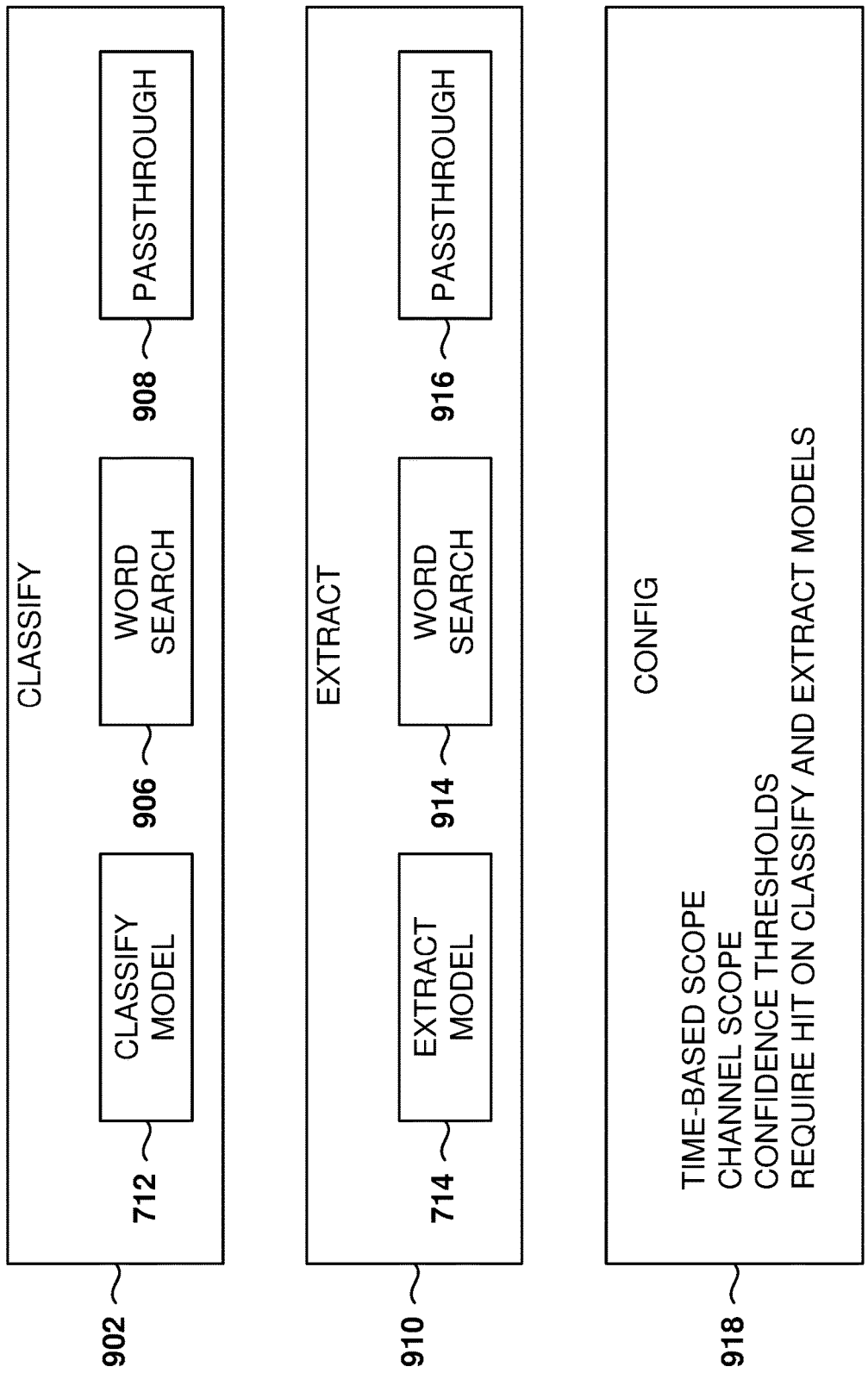
FIG. 9 illustrates the process of extracting parameter values from a conversation, according to some example embodiments.

FIG. 9 illustrates the process of extracting parameter values from a conversation, according to some example embodiments. The classify-extract framework is configurable to perform the classification 902 and extraction 910 operations in multiple ways. Multiple options are available depending on the state that is desired to detect.

For example, for a classify operation 902, there are several possibilities: the classify model 712 may classify, a word search 906 may be used, or simply a passthrough 908, which means that all turns are considered a match (typically leaving up to the extract operation to find the adequate data, if any). For example, the classification may include finding one of the following words: "recording," "recorded," or "record."

Further, an extract operation 910 can be performed by the extract ML model 714, or with a literal classifier that performs word searches 914, or also a passthrough 916, which is extracting the complete text of the turn.

Further, additional parameters may be configured 918 at a global level. The first parameter is a filter to select only a predetermined section of the conversation. For example, in cases where an introduction is being detected, the introduction typically takes place within the first five minutes, and that is where the system will search by setting a filter to select only the first five minutes.

In other cases, the scope may be used as a filter, where the scope determines the party to the conversation. For example, for certain states, only what the agent is saying may be of interest for detecting these states. Also, as discussed above, the confidence level, provided by any ML model determining when a match is made, is configurable to a certain value. For example, the threshold may be set within a range of 0.6 to 0.98, but other values are also possible.

In some example embodiments, to determine that a given estate has been found, that both the classify ML model 712 and the extract ML model 714 have to provide positive matches.

Figure 10:
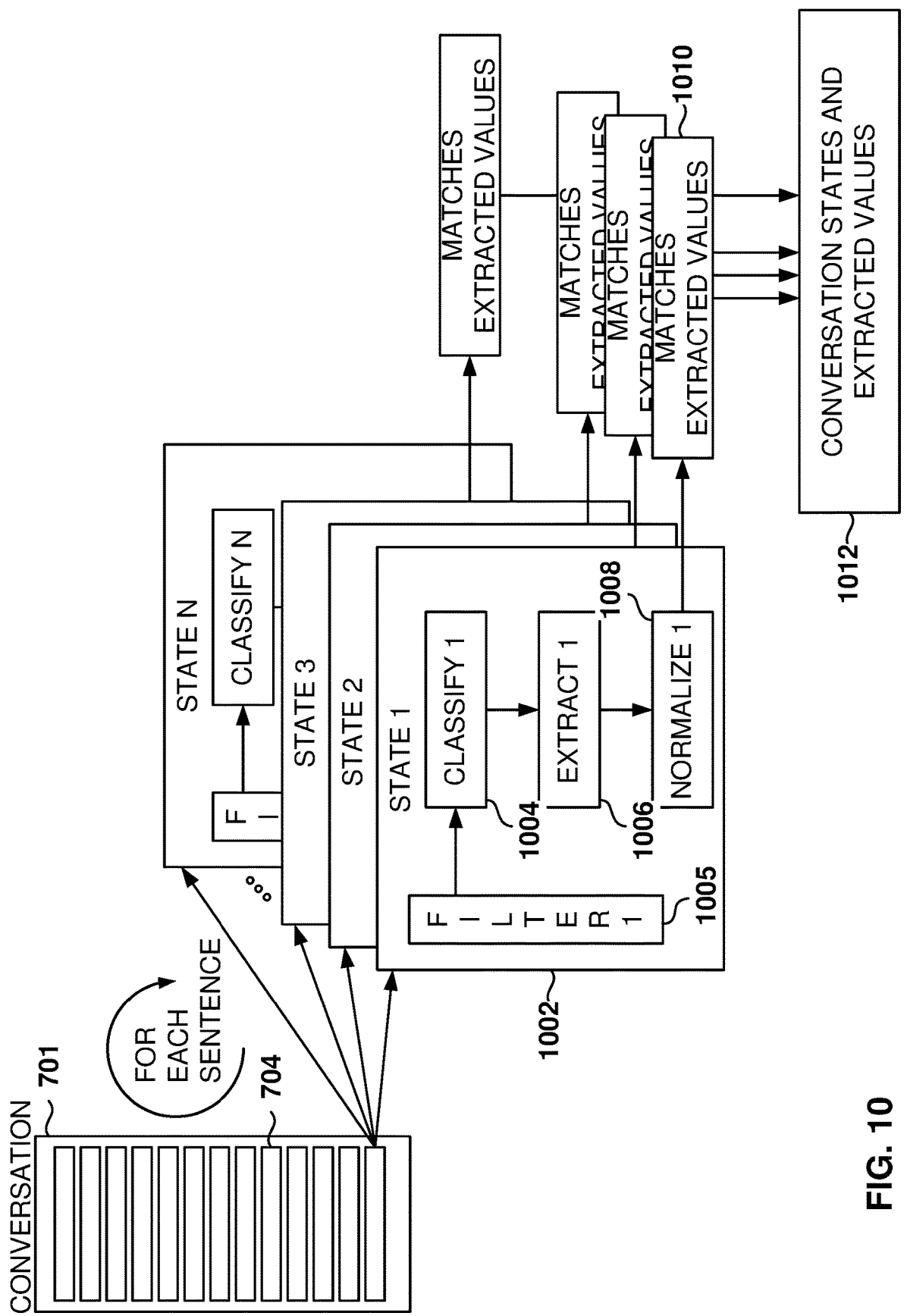
FIG. 10 illustrates the processing of a conversation to identify a plurality of possible states, according to some example embodiments.

FIG. 10 illustrates the processing of a conversation to identify a plurality of possible states 1002, according to some example embodiments. In some example embodiments, finding states of a conversation 701 includes analyzing all the turns 704 of the conversation.

For each state 1002 being detected, the process includes analyzing each of the turns 704. An optional filter operation 1005 may be performed to eliminate some of the turns, such as selecting only turns from the customer, only turns from the agent, or selecting the first five minutes for classification while ignoring the rest of the conversation.

A classify operation 1004 is for classifying the turn 704, as described above, and may be performed by a classify ML model for using other methods, such as text search.

An extract operation 1006 is performed on the turns determined to be matches by the classify operation 1004. Further, an optional normalize operation 1008 may be performed to standardize the output of the extract operation 1006.

Analyzing all the turns 704 in the conversation 701, by the respective states 1002, include determining if zero or more matches 1010 were found, and, if a match was found, the extracted value, if any, for the match 1010. When the outputs are combined, the final result is a list 1012 of conversation states and extracted values.

Figure 11:
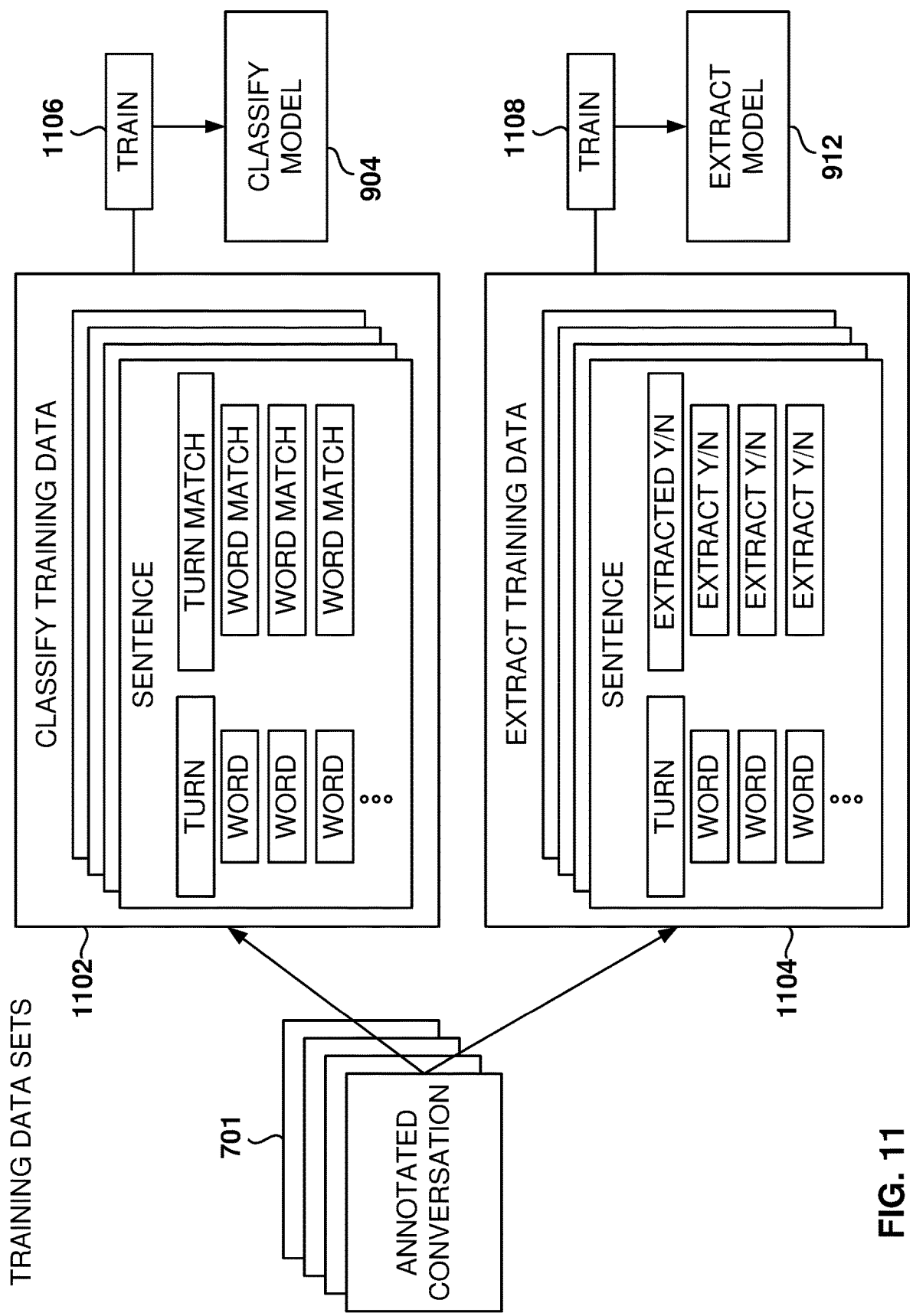
FIG. 11 illustrates the creation of the training data for the classify and extract models, according to some example embodiments.

FIG. 11 illustrates the creation of the training data for the classify and extract models, according to some example embodiments. To build the training data 1102, 1104, the annotated conversations 701 are utilized; that is, the conversations that have been classified as having one or more states and zero or more extracted values from the states are used.

In some example embodiments, two different sets of training data are built: the classify training data 1102 and the extract training data 1104. In other example embodiments, one training data set may be built and used by both the classify ML model and the extract ML model.

In some example embodiments, the classify training data 1102 includes the list of turns from the annotated conversations 701, and for each turn, a value indicating if the turn is a match for one or more states, and if so, the identifier of the one or more states. Further, for each word, an identifier indicates in the word is a match for the one or more states.

For example, one classifier is for detecting when the agent provides her name. However, not all turns in the conversation with a name may be a match, as conversations may include other names, such as the name of the customer, a relative of the customer, a reference, and so forth.

In one example embodiment, this information for the sentence is encoded as follows:

< MATCH > Before we dive in, I want to let you know this is a recorded line </MATCH>

This indicates that the turn, "Before we dive in, I want to let you know this is a recorded line" is a match. Further, a tag may be assigned to the words, although this may be optional in some models. For example, using "M" to indicate a match, this information is encoded as follows:

(Before, M), (we, M), (dive, M), (in, M), (I, M), (want, M), (to, M), (let, M), (you, M), (know, M), (this, M), (is, M), (a, M), (recorded, M), (line, M)

The extract training data 1104 is built by identifying if a value has been extracted from each turn. Optionally, the words in the turn may also be tagged to indicate if the word is a match for the extracted value.

In one example embodiment, this information for the sentence is encoded as follows:

```
<NONE> Before we dive in, I want to let you know
</NONE>
<MATCH> this is a recorded line </MATCH>
```

Further, a tag may be assigned to the words, although this may be optional in some models. For example, using "M" to indicate a match and "NM" to indicate no-match, this information is encoded as follows:

```
(Before, NM), (we, NM), (dive, NM), (in, NM), (I, NM),
(want, NM), (to, NM), (let, NM), (you, NM), (know, 1VM), (this, M), (is, M), (a, M), (recorded, M), (line, M)
```

This indicates that, within the turn, "Before we dive in, I want to let you know," "Before we dive in" is not a match, and "this is a recorded line" is a match.

To obtain the classify ML model 904, a ML algorithm is trained 1106 with the classify training data 1102, and to obtain the extract ML model 912, a machine-learning algorithm is trained 1108 with the extract training data 1104. It is noted that the ML algorithms for classify and extract data may be the same or may be different.

It is noted that other embodiments may tag the training data. In some example embodiments, utterances may be used instead of, or in addition to, words in the turn. Other embodiments may use sub-words, with are parts of words.

In some example embodiments, the training data for both classify model 904 and extract model 912 may be the same, which may simplify the number of training data sets required indicate that the service provider has two support many different customers with many types of different states.

Further, in some example embodiments, one single model may be used to classify and extract, and this model would take the turn as an input and the result will include the identification of the states found and the extracted values for each of the states.

FIG. 12 is an example of a classify-extract operation using literal spotting, according to some example embodiments. The illustrated example is to find out if the agent has said that the conversation is being recorded. In this case, the classify operation includes searching a list of given terms, such as "recorded line," "recorded call," and the like.

The extract operation is the same as the classify operation, which is doing a text search of literal terms. Table 1202 illustrates the turns in the transcript, whether the turn is a match, and the extracted value. In this case, the first turn is a match and the following two terms are not matches. The extracted value is a text string "recorded call," which is matched with an identifier for the state RecordingMention.

FIG. 13 is an example of a classify-extract operation to obtain an identifier value, according to some example embodiments. The illustrated example is to extract an identifier Customerid provided by the customer. In this case, the classify operation is a pass-through, which means that every turn always matches the classify operation, and it is left to the extract operation to provide the identifier, if found.

The extract operation is an entity recognition ML model that detects customer identifiers. If the extract operation provides a value, the normalized operation uses heuristic or a normalize ML model to convert the extracted value to a standardized format.

Table 1302 illustrates the turns in the transcript, whether the turn is a match (for the extract operation), and the extracted value in standardized format. In this case, the first and second turns are not a match, and the third turn is a match. The extracted value is a text string "A A C 1 2 3 4 5 V" for the Customerid value, and the normalized value is a text string "AAC12345V." In this case, the normalize operation eliminates the spaces between the characters.

It is noted that the normalize operation is more than just eliminating the spaces. For example, the normalized result would be the same for the text string "Alpha alpha cat one two three 4 5 Victor." The normalize operation detects that some characters are provided by a representative word that starts with the desired character.

FIG. 14 is an example of a classify-extract operation using semantic spotting, according to some example embodiments. The illustrated example is to determine is the customer has been asked about making healthcare decisions. In this case, the classify operation is a semantic search using natural language processing to determine if the term "healthcare decisions" or an equivalent one has been provided. The extract operation is to extract the term "healthcare decisions" or a provided equivalent.

Table 1402 illustrates the turns in the transcript, whether the turn is a match, and the identified state, named HealthcareDecisionsMention. In this case, the second turn is a match and the extracted value is a text string "medical choices" for HealthcareDecisionsMention state.

FIG. 15 is an example of a question-answer sequence detection, according to some example embodiments. In some example embodiments, the question-answer sequence detection includes running a classify-extract operation for the question, and once the question is detected, executing a classify-extract operation for the answer for a predetermined number of sentences following the detection of the question.

In the illustrated example, the question to be detected is for the conditions of the existing loan of the customer. In this case, the classify operation detects the question in the third turn, "Can I ask what are the conditions of your loan?" as illustrated in Table 1502.

The answer-detection process is executed over the following turns, e.g., the next 20 turns, but other values are also possible. Table 1504 illustrates the answer detection. In this case, the first turn after the question identifies that the interest rate LoanInterestRate is extracted as "3 percent." The third turn identifies the loan term LoanDuration is extracted as "3 years."

Figure 16:
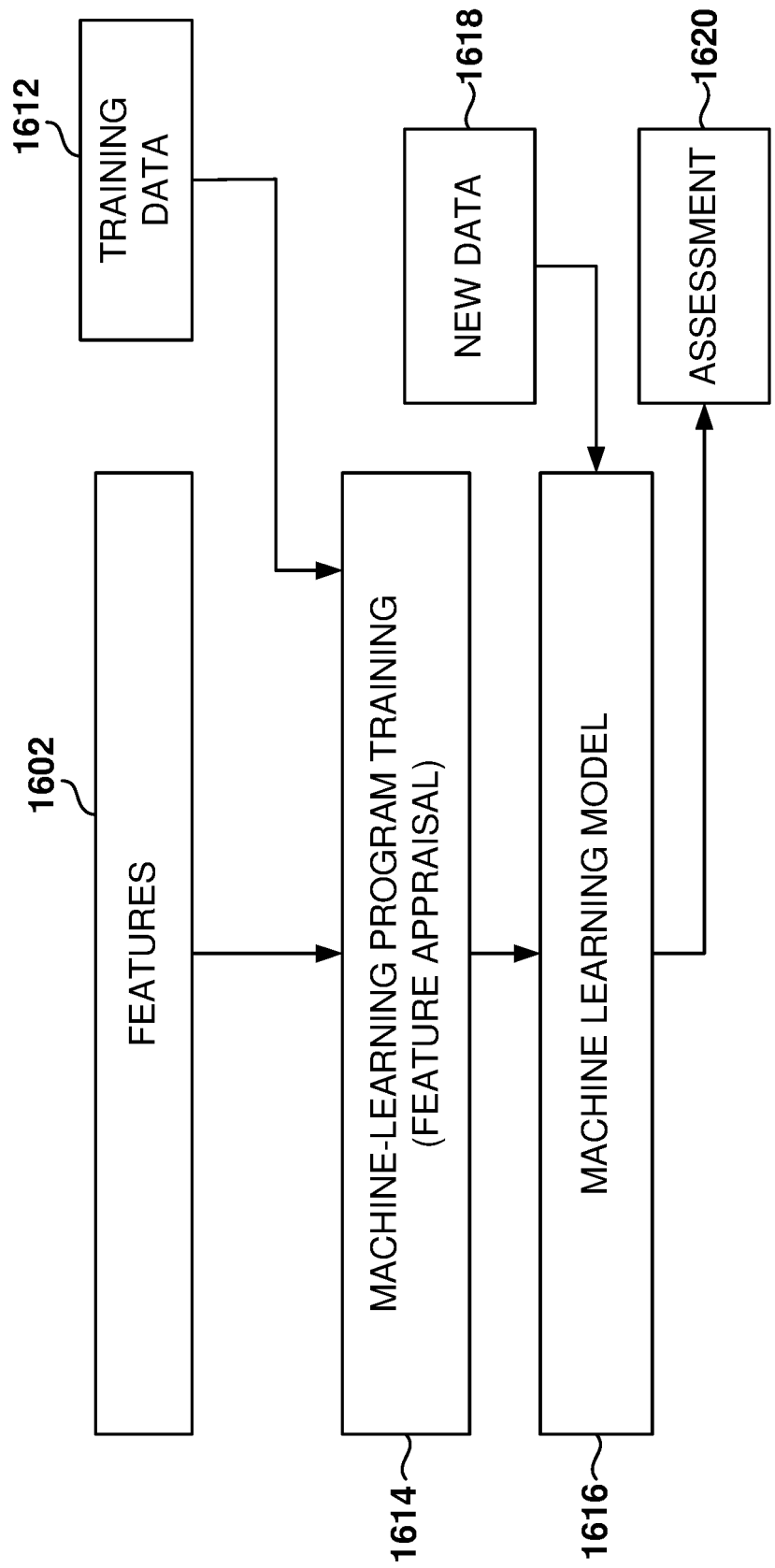
FIG. 16 is a flow chart illustrating the training and use of a machine-learning program, according to some example embodiments.

FIG. 16 illustrates the training and use of a ML program (MLP), according to some example embodiments. In some example embodiments, MLPs, also referred to as ML algorithms or tools, are utilized to perform operations associated with generation of text summaries for text documents.

ML is an application that provides computer systems the ability to perform tasks, without explicitly being programmed, by making inferences based on patterns found in the analysis of data. ML explores the study and construction of algorithms, also referred to herein as tools, that may learn from existing data and make predictions about new data. Such ML algorithms operate by building an ML model 1616 from example training data 1612 in order to make data-driven predictions or decisions expressed as outputs or assessments 1620 based on new-data inputs 1618. Although example embodiments are presented with respect to a few ML tools, the principles presented herein may be applied to other ML tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs.

Unsupervised ML is the training of an ML algorithm using information that is neither classified nor labeled, and allowing the algorithm to act on that information without guidance. Unsupervised ML is useful in exploratory analysis because it can automatically identify structure in data.

Some examples of commonly used supervised-ML algorithms are Logistic Regression (LR), Naive-Bayes, Random Forest (RF), neural networks (NN), deep neural networks (DNN), matrix factorization, and Support Vector Machines (SVM). Some common tasks for unsupervised ML include clustering, representation learning, and density estimation. Some examples of commonly used unsupervised-ML algorithms are K-means clustering, principal component analysis, and autoencoders.

In some embodiments, the ML model 1616 is used to perform analysis of a conversation. For example, the five primitives illustrated in FIG. 8 may be implemented as ML models. In some example embodiments, one ML model 1616 is used for a classify operation, another ML model is used for an extract operation, and another ML model is used for a normalize operation.

The training data 1612 comprises examples of values for the features 1602. In some example embodiments, the training data comprises labeled data with examples of values for the features 1602 and labels indicating the outcome, such as summaries of conversations, parameters extracted, turns identified, places where a name was found, and so forth. The machine-learning algorithms utilize the training data 1612 to find correlations among identified features 1602 that affect the outcome. In some example embodiments, the training data is obtained utilizing the procedure described above with reference to FIG. 10.

A feature 1602 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs. In one example embodiment, the features 1602 may be of different types and may include words used in the conversations, labels identified in the conversation, call sentiment, voicemail flag, and so forth.

During training 1614, the ML algorithm analyzes the training data 1612 based on identified features 1602 defined for the training. The result of the training 1614 is an ML model 1616 that is capable of taking inputs to produce assessments. In some example embodiments, the inputs include a transcript of a conversation, and the output is an identified state, a parameter extracted, an annotation in the text, and so forth.

Training the ML algorithm involves analyzing large amounts of data (e.g., from several gigabytes to a terabyte or more) in order to find data correlations. The ML algorithms utilize the training data 1612 to find correlations among the identified features 1602 that affect the outcome or assessment 1620. In some example embodiments, the training data 1612 includes labeled data, which is known data for one or more identified features 1602 and one or more outcomes, such as the summaries generated.

The ML algorithms usually explore many possible functions and parameters before finding what the ML algorithms identify to be the best correlations within the data; therefore, training may make use of large amounts of computing resources and time.

Figure 17:
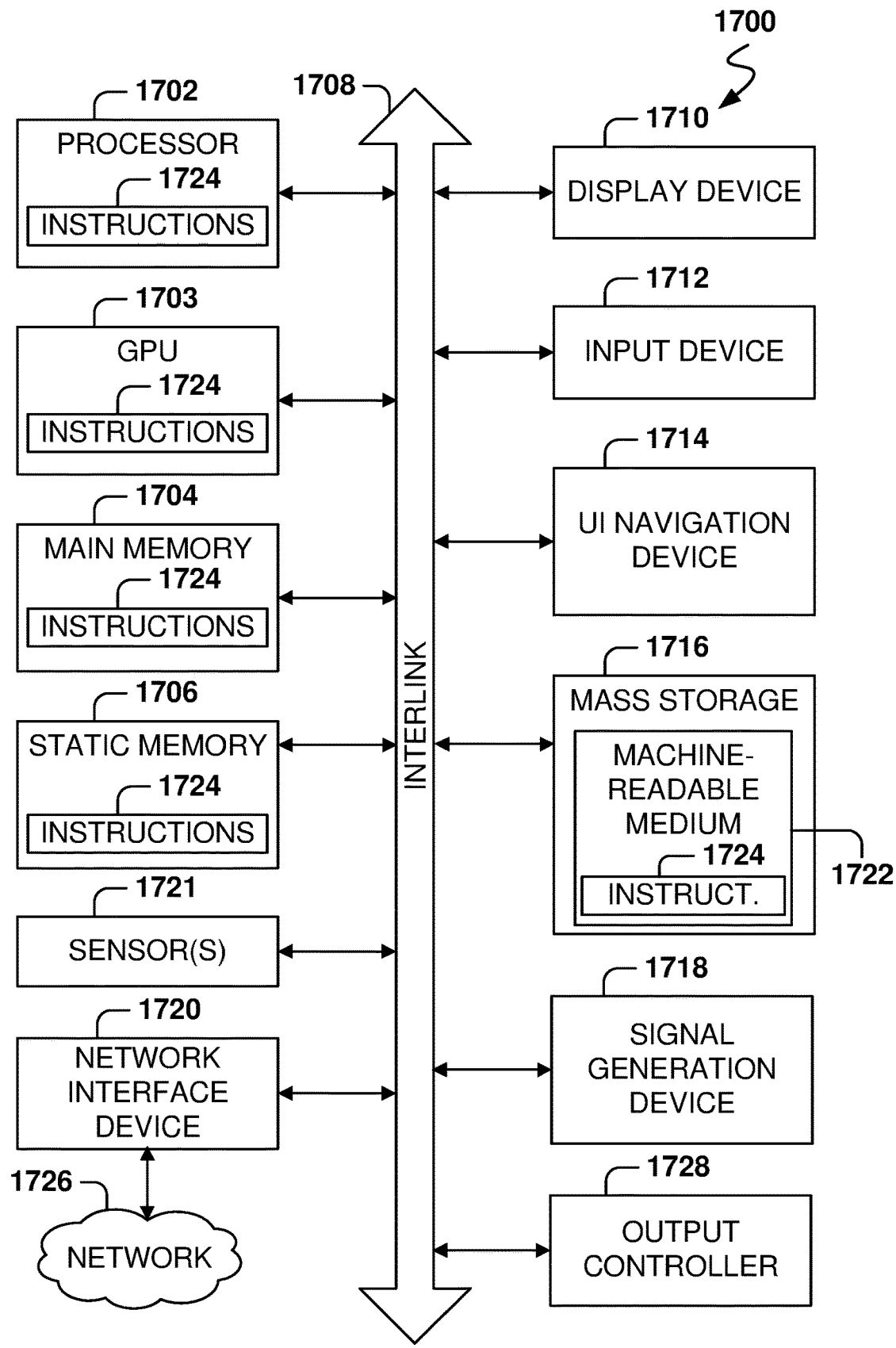
FIG. 17 is a block diagram illustrating an example of a machine upon or by which one or more example process embodiments described herein may be implemented or controlled.

FIG. 17 is a block diagram illustrating an example of a machine 1700 upon or by which one or more example process embodiments described herein may be implemented or controlled. In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in a peer-to-peer (P2P) (or other distributed) network environment. Further, while only a single machine 1700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1700 may include a hardware processor 1702 (e.g., a central processing unit (CPU), a hardware processor core, or any combination thereof), a graphics processing unit (GPU) 1703, a main memory 1704, and a static memory 1706, some or all of which may communicate with each other via an interlink (e.g., bus) 1708. The machine 1700 may further include a display device 1710, an alphanumeric input device 1712 (e.g., a keyboard), and a user interface (UI) navigation device 1714 (e.g., a mouse). In an example, the display device 1710, alphanumeric input device 1712, and UI navigation device 1714 may be a touch screen display. The machine 1700 may additionally include a mass storage device (e.g., drive unit) 1716, a signal generation device 1718 (e.g., a speaker), a network interface device 1720, and one or more sensors 1721, such as a Global Positioning System (GPS) sensor, compass, accelerometer, or another sensor. The machine 1700 may include an output controller 1728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1716 may include a machine-readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within the static memory 1706, within the hardware processor 1702, or within the GPU 1703 during execution thereof by the machine 1700. In an example, one or any combination of the hardware processor 1702, the GPU 1703, the main memory 1704, the static memory 1706, or the mass storage device 1716 may constitute machine-readable media.

While the machine-readable medium 1722 is illustrated as a single medium, the term "machine-readable medium" may include a single medium, or multiple media, (e.g., a centralized or distributed database, and/or associated caches and servers) configured to store the one or more instructions 1724.

The term "machine-readable medium" may include any medium that is capable of storing, encoding, or carrying instructions 1724 for execution by the machine 1700 and that cause the machine 1700 to perform any one or more of the techniques of the present disclosure, or that is capable of storing, encoding, or carrying data structures used by or associated with such instructions 1724. Non-limiting machine-readable medium examples may include solid-state memories, and optical and magnetic media. In an example, a massed machine-readable medium comprises a machine-readable medium 1722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1724 may further be transmitted or received over a communications network 1726 using a transmission medium via the network interface device 1720.

Figure 18:
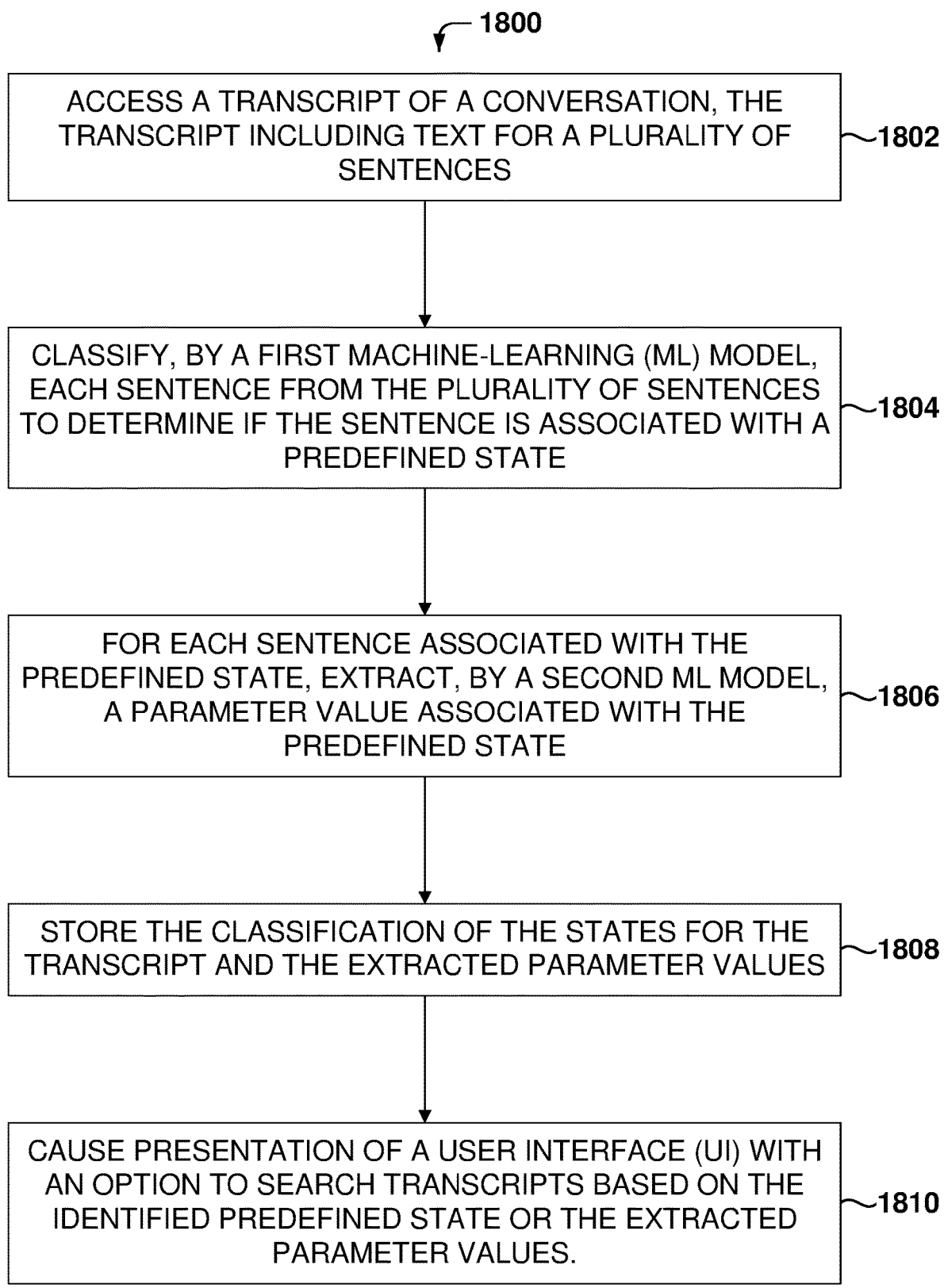
FIG. 18 is a flowchart of a method for classifying information in conversations and extracting information from the conversations, according to some example embodiments.

FIG. 18 is a flowchart of a method 1800 for classifying information in conversations and extracting information from the conversations, according to some example embodiments. While the various operations in this flowchart are presented and described sequentially, one of ordinary skill will appreciate that some or all of the operations may be executed in a different order, be combined or omitted, or be executed in parallel.

Operation 1802 is for accessing, by one or more processors, a transcript of a conversation, the transcript including text for a plurality of sentences.

From operation 1802, the method 1800 flows to operation 1804 where a first machine-learning (ML) model classifies each sentence from the plurality of sentences to determine if the sentence is associated with a predefined state.

From operation 1804, the method 1800 flows to operation 1806 where a second ML model extracts, for each sentence associated with the predefined state, a parameter value associated with the predefined state From operation 1806, the method 1800 flows to operation 1808 where the one or more processors store the classification of the states for the transcript and the extracted parameter values.

From operation 1808, the method 1800 flows to operation 1810 for causing presentation, by the one or more processors, of a user interface (UI) with an option to search transcripts based on the identified predefined state or the extracted parameter values.

In one example, the method 1800 further comprises normalizing, by a third ML model, the extracted parameter value to convert the extracted parameter value to a predefined format.

In one example, classifying each sentence comprises providing a result comprising a value indicating when there is a match, a name of the state when there is a match, and a score indicating a confidence level for the classifying.

In one example, the first ML model is obtained by training a first ML program with training data, the training data comprising a set of transcripts from conversations, turns identified within the conversations, and values indicating if each turn is a match for one or more predefined states.

In one example, the features of the first ML model comprise one or more of turns within the transcript, states within the transcript, and states identified in the transcript.

In one example, the second ML model is obtained by training a second ML program with training data, the training data comprising a set of transcripts from conversations, turns identified within the conversations, and parameter values extracted from the conversations.

In one example, the method 1800 further comprises, before classifying each sentence, applying a filter to select sentences from the transcript for the classifying, the filter comprising one of selecting sentences spoken by one party and selecting a period of time within the conversation.

In one example, the predefined state corresponds to a question within the conversation, the method 1800 further comprising executing a classify-extract operation for an answer to the question for a predetermined number of sentences following the sentence with the question.

In one example, the predefined state is for obtaining a customer identifier, wherein the extracting is for extracting the customer identifier.

In one example, the UI includes search options comprising an option to include or exclude a transcript having a specified value for the parameter value.

Another general aspect is for a system that includes a memory comprising instructions and one or more computer processors. The instructions, when executed by the one or more computer processors, cause the one or more computer processors to perform operations comprising: accessing a transcript of a conversation, the transcript including text for a plurality of sentences; classifying, by a first machine-learning (ML) model, each sentence from the plurality of sentences to determine if the sentence is associated with a predefined state; for each sentence associated with the predefined state, extracting, by a second ML model, a parameter value associated with the predefined state; storing the classification of the states for the transcript and the extracted parameter values; and causing presentation of a user interface (UI) with an option to search transcripts based on the identified predefined state or the extracted parameter values.

In yet another general aspect, a machine-readable storage medium (e.g., a non-transitory storage medium) includes instructions that, when executed by a machine, cause the machine to perform operations comprising: accessing a transcript of a conversation, the transcript including text for a plurality of sentences; classifying, by a first machine-learning (ML) model, each sentence from the plurality of sentences to determine if the sentence is associated with a predefined state; for each sentence associated with the predefined state, extracting, by a second ML model, a parameter value associated with the predefined state; storing the classification of the states for the transcript and the extracted parameter values; and causing presentation of a user interface (UI) with an option to search transcripts based on the identified predefined state or the extracted parameter values.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   accessing, by one or more processors, a transcript of a conversation, the transcript including text for a plurality of sentences;
   separately for each sentence in the plurality of sentences and by a first machine-learning (ML) model, classifying the sentence to determine if that sentence is associated with a predefined state among a plurality of predefined states;
   separately for each sentence associated with the predefined state, extracting, by a second ML model, a parameter value associated with the predefined state for that sentence;
   storing, by the one or more processors, classifications of predefined states for the plurality of sentences of the transcript and extracted parameter values for the plurality of sentences; and
   causing presentation, by the one or more processors, of a user interface (UI) with an option to search transcripts for sentences based on at least one of a predefined state among the plurality of predefined states or an extracted parameter value among the extracted parameter values.

2. The method as recited in claim 1, further comprising:
   normalizing, by a third ML model, the extracted parameter value to convert the extracted parameter value to a predefined format.

3. The method as recited in claim 1, wherein the classifying of each sentence comprises:
   providing a result comprising a value indicating when there is a match, a name of the state when there is a match, and a score indicating a confidence level for the classifying.

4. The method as recited in claim 1, wherein the first ML model is obtained by training a first ML program with training data, the training data comprising a set of transcripts from conversations, turns identified within the conversations, and values indicating if each turn is a match for one or more predefined states.

5. The method as recited in claim 1, wherein features of the first ML model comprise at least one of turns within the transcript, states within the transcript, or states identified in the transcript.

6. The method as recited in claim 1, wherein the second ML model is obtained by training a second ML program with training data, the training data comprising a set of transcripts from conversations, turns identified within the conversations, and parameter values extracted from the conversations.

7. The method as recited in claim 1, further comprising:
   before classifying each sentence, applying a filter to select sentences from the transcript for the classifying, the filter comprising at least one of selecting sentences spoken by one party or selecting a period of time within the conversation.

8. The method as recited in claim 1, wherein the predefined state corresponds to a question within the conversation, the method further comprising:
   executing a classify-extract operation for an answer to the question for a predetermined number of sentences following the sentence with the question.

9. The method as recited in claim 1, wherein the predefined state is for obtaining a customer identifier, wherein the extracting is for extracting the customer identifier.

10. The method as recited in claim 1, wherein the UI includes search options comprising an option to include or exclude a transcript having a specified value for the parameter value.

11. A system comprising:
a memory comprising instructions; and
one or more computer processors, wherein the instructions, when executed by the one or more computer processors, cause the system to perform operations comprising:
accessing a transcript of a conversation, the transcript including text for a plurality of sentences;
separately for each sentence in the plurality of sentences and by a first machine-learning (ML) model, classifying the sentence to determine if that sentence is associated with a predefined state among a plurality of predefined states;
separately for each sentence associated with the predefined state, extracting, by a second ML model, a parameter value associated with the predefined state for that sentence;
storing classifications of predefined states for the plurality of sentences of the transcript and extracted parameter values for the plurality of sentences; and
causing presentation of a user interface (UI) with an option to search transcripts for sentences based on at least one of a predefined state among the plurality of predefined states or an extracted parameter value among the extracted parameter values.

12. The system as recited in claim 11, wherein the instructions further cause the one or more computer processors to perform operations comprising:
normalizing, by a third ML model, the extracted parameter value to convert the extracted parameter value to a predefined format.

13. The system as recited in claim 11, wherein the classifying of each sentence comprises:
providing a result comprising a value indicating when there is a match, a name of the state when there is a match, and a score indicating a confidence level for the classifying.

14. The system as recited in claim 11, wherein the first ML model is obtained by training a first ML program with training data, the training data comprising a set of transcripts from conversations, turns identified within the conversations, and values indicating if each turn is a match for one or more predefined states.

15. The system as recited in claim 11, wherein features of the first ML model comprise at least one of turns within the transcript, states within the transcript, or states identified in the transcript.

16. A non-transitory machine-readable storage medium including instructions that, when executed by a machine, cause the machine to perform operations comprising:
accessing a transcript of a conversation, the transcript including text for a plurality of sentences;
separately for each sentence in the plurality of sentences and by a first machine-learning (ML) model, classifying the sentence to determine if that sentence is associated with a predefined state among a plurality of predefined states;
separately for each sentence associated with the predefined state, extracting, by a second ML model, a parameter value associated with the predefined state for that sentence;
storing classifications of predefined states for the plurality of sentences of the transcript and extracted parameter values for the plurality of sentences; and
causing presentation of a user interface (UI) with an option to search transcripts for sentences based on at least one of a predefined state among the plurality of predefined states or an extracted parameter value among the extracted parameter values.

17. The non-transitory machine-readable storage medium as recited in claim 16, wherein the operations further comprise:
normalizing, by a third ML model, the extracted parameter value to convert the extracted parameter value to a predefined format.

18. The non-transitory machine-readable storage medium as recited in claim 16, wherein the classifying of each sentence comprises:
providing a result comprising a value indicating when there is a match, a name of the state when there is a match, and a score indicating a confidence level for the classifying.

19. The non-transitory machine-readable storage medium as recited in claim 16, wherein the first ML model is obtained by training a first ML program with training data, the training data comprising a set of transcripts from conversations, turns identified within the conversations, and values indicating if each turn is a match for one or more predefined states.

20. The non-transitory machine-readable storage medium as recited in claim 16, wherein features of the first ML model comprise at least one of turns within the transcript, states within the transcript, or states identified in the transcript.

* * * * *